US008505958B2

(12) United States Patent
Thomas et al.

(10) Patent No.: US 8,505,958 B2
(45) Date of Patent: Aug. 13, 2013

(54) SIT OR STAND STROLLERS AND METHODS OF MAKING THE SAME

(75) Inventors: Wes Thomas, Kenosha, WI (US); Toriono Granger, Chicago, IL (US); James Morrow, Chicago, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 480 days.

(21) Appl. No.: 12/730,948

(22) Filed: Mar. 24, 2010

(65) Prior Publication Data

US 2010/0244393 A1 Sep. 30, 2010

Related U.S. Application Data

(60) Provisional application No. 61/163,351, filed on Mar. 25, 2009.

(51) Int. Cl.
*B62B 9/12* (2006.01)
(52) U.S. Cl.
USPC .......................... 280/650; 280/643; 280/47.4
(58) Field of Classification Search
USPC ................. 280/642, 643, 644, 647, 648, 650, 280/657, 658, 47.38, 47.39, 47.41, 47.4
See application file for complete search history.

(56) References Cited

U.S. PATENT DOCUMENTS

| | | | |
|---|---|---|---|
| 4,685,688 A * | 8/1987 | Edwards | 280/30 |
| 4,923,208 A * | 5/1990 | Takahashi et al. | 280/642 |
| D321,850 S | 11/1991 | Mong-Hsing | |
| 5,090,724 A | 2/1992 | Fiore | |
| 5,125,674 A * | 6/1992 | Manuszak | 280/30 |
| 5,622,375 A | 4/1997 | Fairclough | |
| 5,664,795 A | 9/1997 | Haung | |
| 5,765,855 A * | 6/1998 | Chiu | 280/642 |
| 5,839,748 A | 11/1998 | Cohen | |
| 6,086,087 A | 7/2000 | Yang | |
| 6,286,844 B1 * | 9/2001 | Cone et al. | 280/47.41 |
| 6,447,001 B1 * | 9/2002 | Hsia | 280/642 |
| 6,530,591 B2 | 3/2003 | Huang | |
| 6,585,284 B2 * | 7/2003 | Sweeney et al. | 280/650 |
| 6,666,473 B2 | 12/2003 | Hartenstine et al. | |
| 6,676,140 B1 | 1/2004 | Gondobintoro | |
| 6,679,506 B2 * | 1/2004 | Koppes et al. | 280/47.34 |
| 6,736,415 B1 * | 5/2004 | Lenihan | 280/47.19 |
| 6,830,168 B2 * | 12/2004 | Hou | 224/409 |
| 7,044,497 B2 | 5/2006 | Hartenstine et al. | |
| 7,234,722 B1 * | 6/2007 | Madigan et al. | 280/642 |
| 7,789,413 B2 * | 9/2010 | Hei et al. | 280/642 |
| 7,984,923 B2 * | 7/2011 | Yoshie et al. | 280/650 |
| 8,087,680 B2 * | 1/2012 | Dotsey et al. | 280/47.38 |
| 8,128,118 B2 * | 3/2012 | Friisdahl et al. | 280/642 |

(Continued)

OTHER PUBLICATIONS

Redacted Version of Images of Strollers, p. 1.

*Primary Examiner* — John Walters
*Assistant Examiner* — Brian Swenson
(74) *Attorney, Agent, or Firm* — Hanley, Flight & Zimmerman, LLC

(57) ABSTRACT

Sit or stand strollers and methods of using and making the same are described herein. An example stroller includes a frame and a seat having a seat pan. The seat pan is pivotable between a raised position and a lowered position. In the lowered position, the seat pan is to support a child in a seated position. The example stroller also includes a foot platform coupled to the frame to support a child in a standing position.

29 Claims, 21 Drawing Sheets

(56) References Cited

U.S. PATENT DOCUMENTS

| | | | |
|---|---|---|---|
| 2001/0013688 A1* | 8/2001 | Warner et al. | 280/47.38 |
| 2006/0226635 A1* | 10/2006 | Huang | 280/642 |
| 2008/0150247 A1* | 6/2008 | Lake | 280/47.41 |
| 2009/0160162 A1* | 6/2009 | Bizzell et al. | 280/642 |
| 2009/0236826 A1* | 9/2009 | Queen | 280/650 |

* cited by examiner ional Patent Application Ser. No. 61/163,351, entitled "Sit or Stand

SIT OR STAND STROLLERS AND METHODS OF MAKING THE SAME

RELATED APPLICATION

This application claims the benefit of U.S. Provisional Patent Application Ser. No. 61/163,351, entitled "Sit or Stand Strollers and Methods of Using the Same," which was filed on Mar. 25, 2009, and is incorporated herein by reference in its entirety.

FIELD OF THE DISCLOSURE

The present disclosure relates generally to strollers and, in particular, to strollers in which occupant(s) can sit or stand.

BACKGROUND

Child strollers, such as, for example, collapsible strollers are known in the art. Typically, strollers of this type include a foldable frame, wheels, and one or more seats or flat areas to support a child or baby in a seated or lying position.

DETAILED DESCRIPTION

Figure 1:
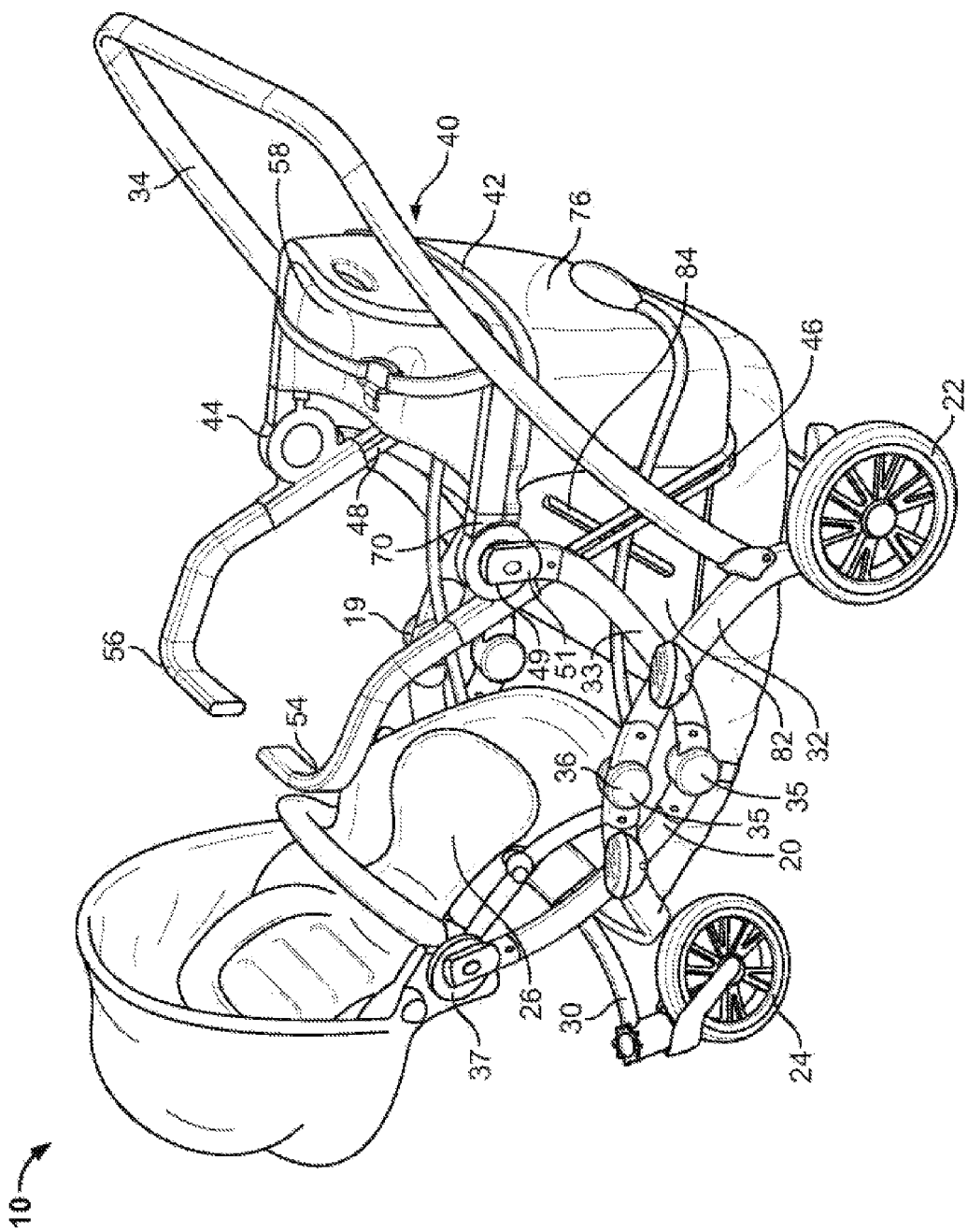
FIG. 1 is a perspective view of an example stroller having an example sit or stand support.

Referring to FIG. 1, an example stroller 10 is shown. The example stroller 10 includes a first frame assembly 19 and a second frame assembly 20 laterally spaced from each other. In this example the distance between the side frames 19 and 20 is approximately the width of a seat. Furthermore, the side frame assemblies 19 and 20 are constructed such as to be moveable between an extending in-use configuration wherein the front and rear legs on a frame side are displaced a distance apart (FIG. 1) and a collapsed, folded, storage position wherein the front and rear legs are positioned in close proximity to one another (not shown). The example stroller 10 also includes rear wheels 22, at least one front wheel 24, and a seat 26. The frame assemblies 19 and 20 each include a generally concave downwardly curved leg support 32 extending from the front of the stroller 10 to the back of the stroller 10. The frame assemblies 19 and 20 also each include a generally concave upwardly curved seat support frame 33. The leg support 32 and the seat support frame 33 are pivotally coupled to enable the folding of the stroller 10 by bringing the front and rear wheels toward one another. A front leg assembly 30 is mounted to the forward end of the leg support 32. A handle 34 (i.e., a parent handle bar) is pivotally mounted to the rearward end of the leg support 32. The front leg assembly 30 is a curved bar extending from the left side to the right side of the stroller 10. The handle 34 is a generally u-shaped structure. Releasable joints 35 at each side of the frame 19 and 20 enable the leg support 32 and the seat frame support 33 to fold from the extended position of FIG. 1 to a collapsed position. The joints 35 of the seat support frame 33 comprise side locks 36 to lock the frame in its open position (shown in FIG. 1), and may be released selectively to allow the stroller 10 to be folded to a closed, compact configuration (not shown). The example strollers described herein are provided for purposes of illustration only. Any suitable stroller, including for example, a three wheel stroller, an umbrella stroller, a jogging stroller, a single-occupant stroller, etc. may benefit from the example sit and stand supports described herein.

The illustrated example stroller is a tandem stroller with reversible seats. The seats 26 (only one of which is shown in FIG. 1) include two receptacles 37; one on each side of the seat 26. The receptacles 37 are located and dimensioned to receive mounts 43 on the upper ends of the seat support frame 33. Spring buttons associated with the receptacles 37 and/or the mounts 43 of the seat support frame 33 secure the seats 26 in either a rearward facing direction (shown in FIG. 1) or a forward facing direction.

In the illustrated example, the stroller 10 includes a sit or stand support 40. The sit or stand support 40 of FIG. 1 includes a child support frame 42 having first and second side rails 46, 48 and a generally horizontal support rail 41. In some examples, the child support frame 42 is fixedly coupled to the seat frame support 33, but in the illustrated example of FIG. 1, the child support frame 42 is releasably secured to the seat frame support 33 via spring buttons. In other examples, the location of the receptacles 51 of the child support 42 may be adjusted to different heights by sliding the support joints 44 carrying the receptacle 51 along the first side rail 46 and the second side rail 48, respectively, and securing them to a corresponding position.

Figure 2:
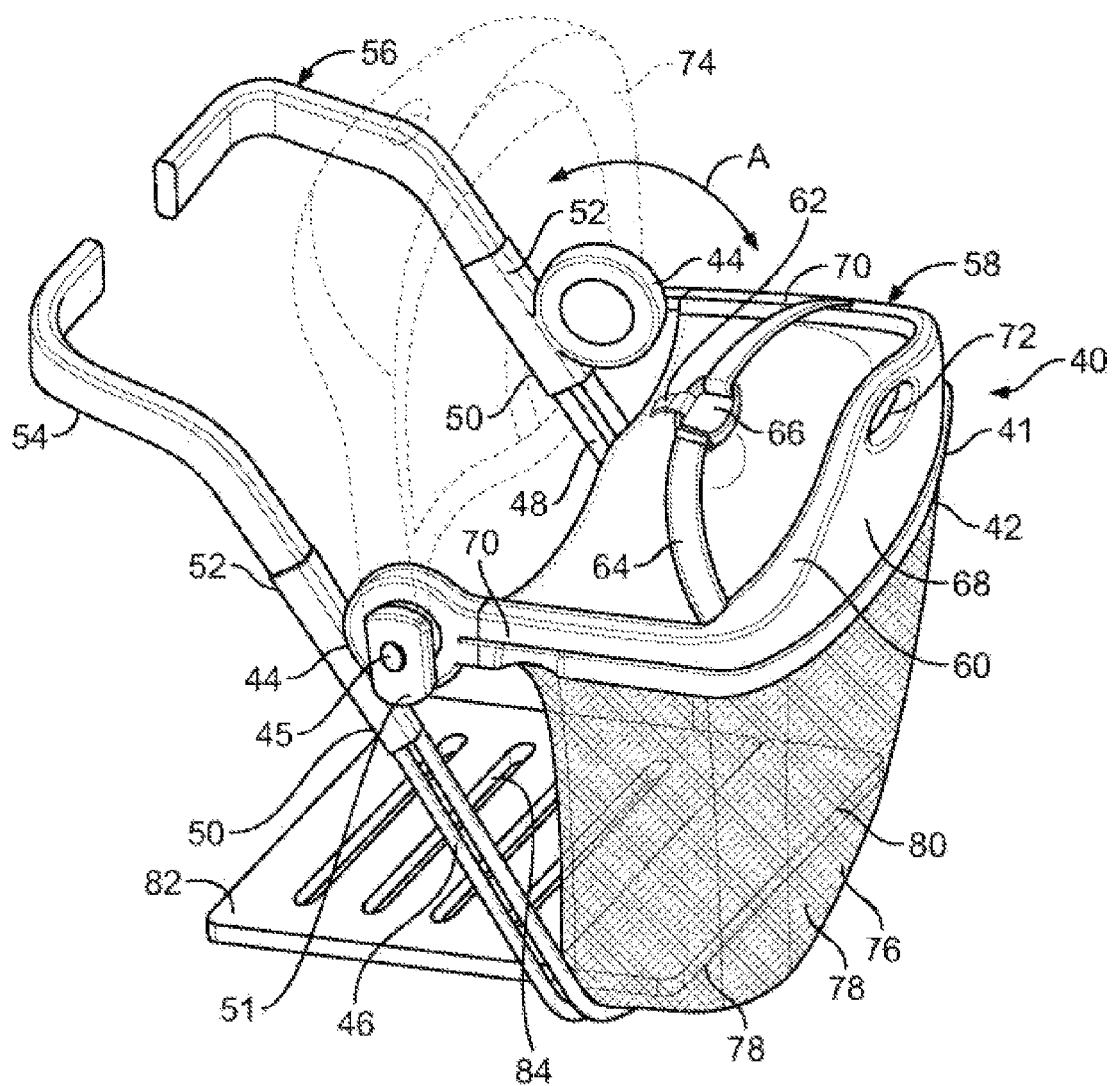
FIG. 2 is an isolated view of the example sit or stand support of FIG. 1.

In the example shown in FIG. 2, the support joints 44 have first tubular extensions 50 and second tubular extensions 52. The first side rail 46 and the second side rail 48 are coupled to the support joints 44 via the first tubular extensions 50. A first side handle 54 and a second side handle 56 are coupled to the support joints 44 via the second tubular extensions 52. In the example shown in FIG. 2 there are two side handles, 54, 56. However, other examples include one u-shaped handle. The handles 54, 56 may be used by a child for support. Furthermore, the handles 54, 56 may be foam or plastic covered to provide a comfortable griping surface for a child. In some examples, a tray, cupholder and/or other accessory may be removably or permanently coupled to the handles 54, 56, the joints 44, or otherwise to the structure of the stroller 10.

The support joints 44 of the illustrated example include the above-mentioned receptacles 51. The receptacles extend from the center of the joints 44 downward. The receptacles 51 each include an opening through which the joints 44 are coupled to the seat support frame 33, as described in more detail below.

The example sit or stand support 40 shown in FIGS. 1 and 2 includes a seat 58. The seat 58 shown in the illustrated example includes a contoured seat surface 60 that is shaped to complement the shape of a child's body. The contoured seat surface includes a crotch post 62 to which a seat belt 64 is coupled. The seat belt 64 in the illustrated example is a three-point belt that has two other ends coupled to the sides of the seat 58. The center of the belt 64 includes a locking clasp 66 to releasable lock the seat belt 64. The seat 58 also includes a seat back 68. The seat back 68 may be any desired height and provides support for a child. In addition, the seat back 68 and seat surface 60 may be padded to provide further comfort to a child seated therein.

The example seat 58 includes two seat side extensions 70 that are rotatably coupled to the support joints 44. To rotate the seat 58 between a lowered positioned, shown in FIGS. 1 and 2 and a raised or open position (shown in a faded outline in FIG. 2), a user grasps the seat 58, for example, via, for instance, a grip opening 72 in the seat back 68 and rotates the seat 58 between the two positions (i.e., along the arc A shown in FIG. 2). The seat 58 may be held in the open position by a locking means in the joint 44. For example, the locking means in the joint 44 may be a pin-type connection using a pin and detent or aperture to lock the seat 58 open at one or a plurality of different heights. The pin may be held in place by friction or may be spring-loaded (e.g., by a Valco pin). Alternatively, the locking means in the joint 44 may be a gear-type connection in which a toothed wheel is spring-biased into engagement with one or more complementary teeth on a rack. The locking means in the joint may be releasably actuated by a user by depressing or releasing a spring-loaded pin or button or, in the case of a friction fit, by applying sufficient force to the seat 58. The support joints 44 respectively include a button 45 that may be actuated to release a locking mechanism that couples the joints 44 with the seat support frame 33 to allow the rear joints 44 and, thus, the entire sit or stand structure 40 to be decoupled from rear assembly 19, 20.

The bottom of the seat 58 includes a groove 74 that fits, at least partially, over the horizontal support rail 41 of the child support 42. When the groove is engaged with the horizontal support rail 41, a seal may be formed between the seat 58 and a storage bin 76 beneath the seat. Furthermore, the groove 74 may include one or more detents on the surface that complement one or more indents formed on the surface of the horizontal support rail 41 (or vice versa). When the seat 58 is lowered onto the horizontal support rail 41, the dent(s) in the groove 74 and the indent(s) on the central frame engage. When the detents(s) in the groove 74 and the indent(s) on the central frame engage, the user may physically feel and/or hear the engagement. This signals to the user that the seat 58 is secure on the horizontal support rail 41 and, thus, that the seat 58 will not move forward and upward while a child is occupying the seat 58.

As noted above, the example sit or stand support 40 also includes the storage bin 76. In the illustrated example, the storage bin 76 includes a plurality of sidewalls 78 that are supported from and extend downward relative to the horizontal support rail 41. The sidewalls 78 may be made of a mesh material, a fabric, a plastic and/or any other suitable material. Further, the sidewalls 78 may be transparent, translucent and/or opaque. In addition, the sidewalls 78 may include a plurality of apertures (e.g., when mesh) through which the contents of the storage bin 76 are visible. The storage bin 76 also includes an at least partially open top (not shown) via which the interior of the storage bin 76 is accessible when the seat 58 is in the raised or open position (shown in shadow in FIG. 2). Furthermore, the storage bin 76 may include shelves, dividers, pockets and/or other organizational structure. The example storage bin 76 may also include a floorboard 80 that may include a stiffening insert and/or be of a relatively firm material to provide structure to the storage bin 76. If desired, the storage bin 76 may be a removable plastic bucket or the like having an upper lip that operates as the horizontal support rail 41 of the child support 42.

As shown in FIGS. 1 and 2, the example sit or stand structure also includes a foot platform 82. The foot platform 82 of the illustrated example supports a child in a standing position and/or a child climbing onto the stroller 10 to access the seat 58. One or more contours or grip-providing structures 84 may be coupled to or integrally formed with the foot platform 82 to provide traction and stability to a child standing, walking or climbing thereon. When in the standing position, a child may face forward and grasp the handles 54, 56 or may face backward and grasp the seat 58 for support. In either position, the handles 54, 56 and the seat 58 form a surrounding structure to enable the child to maintain his/her balance on the platform 82. In some examples the foot platform 82 is fixedly coupled to, for example, the lower ends of the first side rail 46 and the second side rail 48. In other examples, the foot platform 82 may be adjusted to different heights along the first side rail 46 and the second side rail 48. The foot platform 82 may additionally or alternatively be coupled to the stroller frame 19, 20. Another example coupling of a foot platform is discussed below.

The example sit or stand support 40 of FIGS. 1 and 2 is removable from the stroller 10, as noted above, and may be interchanged or replaced with another sit or stand support, a child carrier, or other child caretaking structure. For example, the sit or stand support 40 is exchangeable with a second seat thereby enabling the stroller 10 to be used as a two-seated tandem stroller. To remove the sit or stand structure 40 from the stroller, the sit or stand structure 40 is released from the joints 44, as noted above. It may then be replaced with a seat similar to the shown front seat 26 or other structure.

Figure 3:
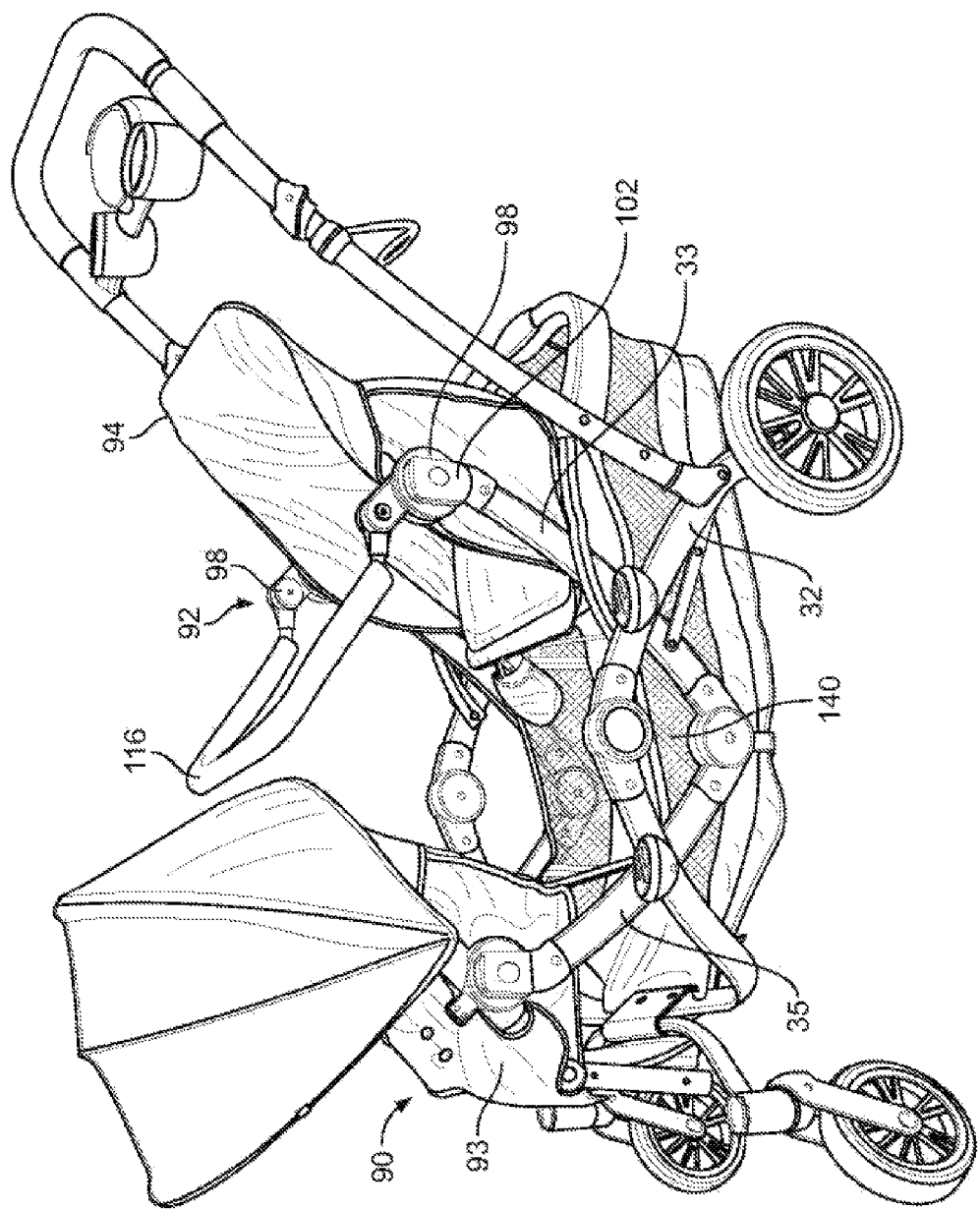
FIG. 3 is a perspective view of an alternative example stroller having an alternative example sit or stand support.
Figure 4:
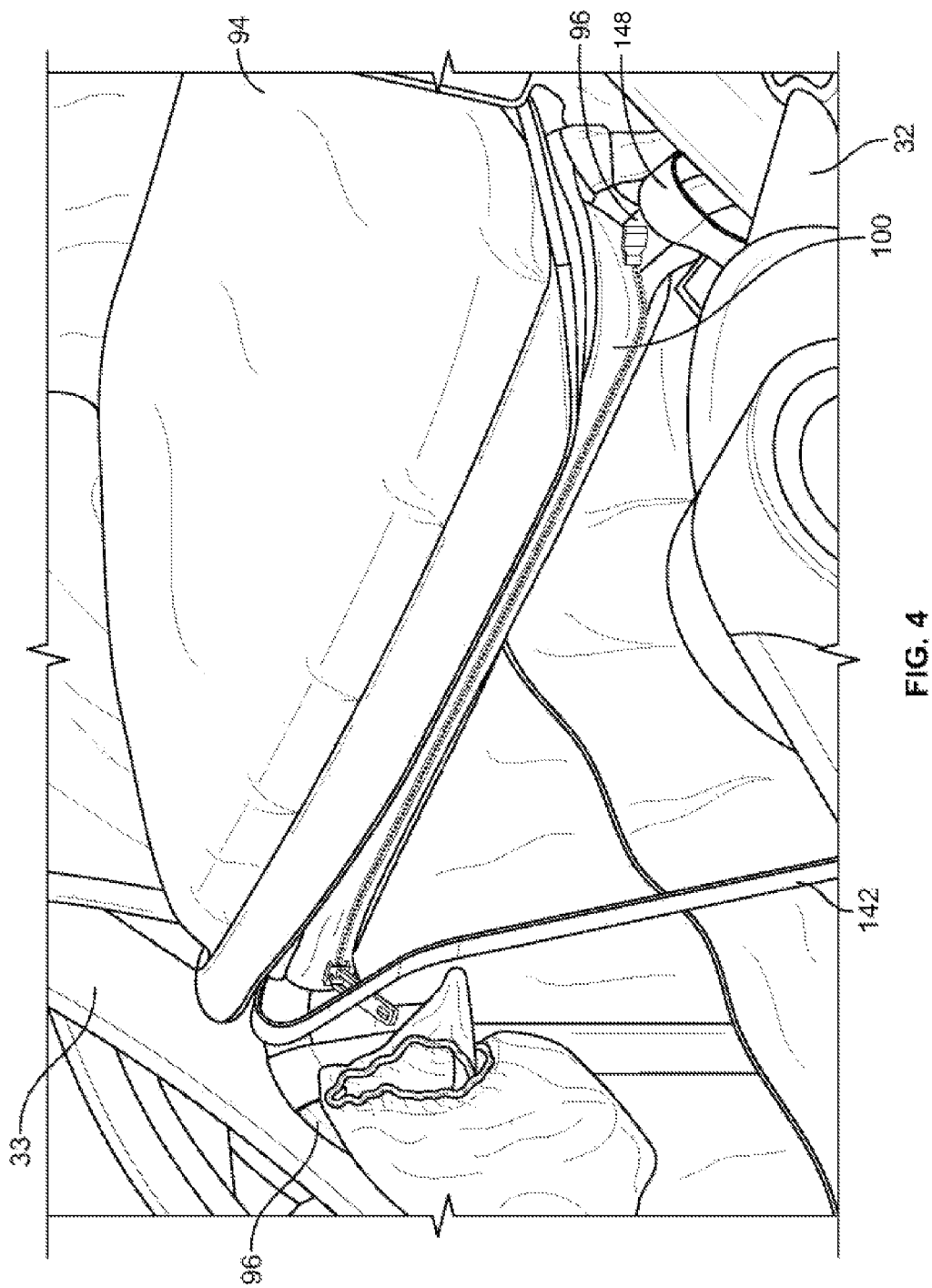
FIG. 4 is an enlarged view of an example seat and frame coupling of the example stroller of FIG. 3.
Figure 5:
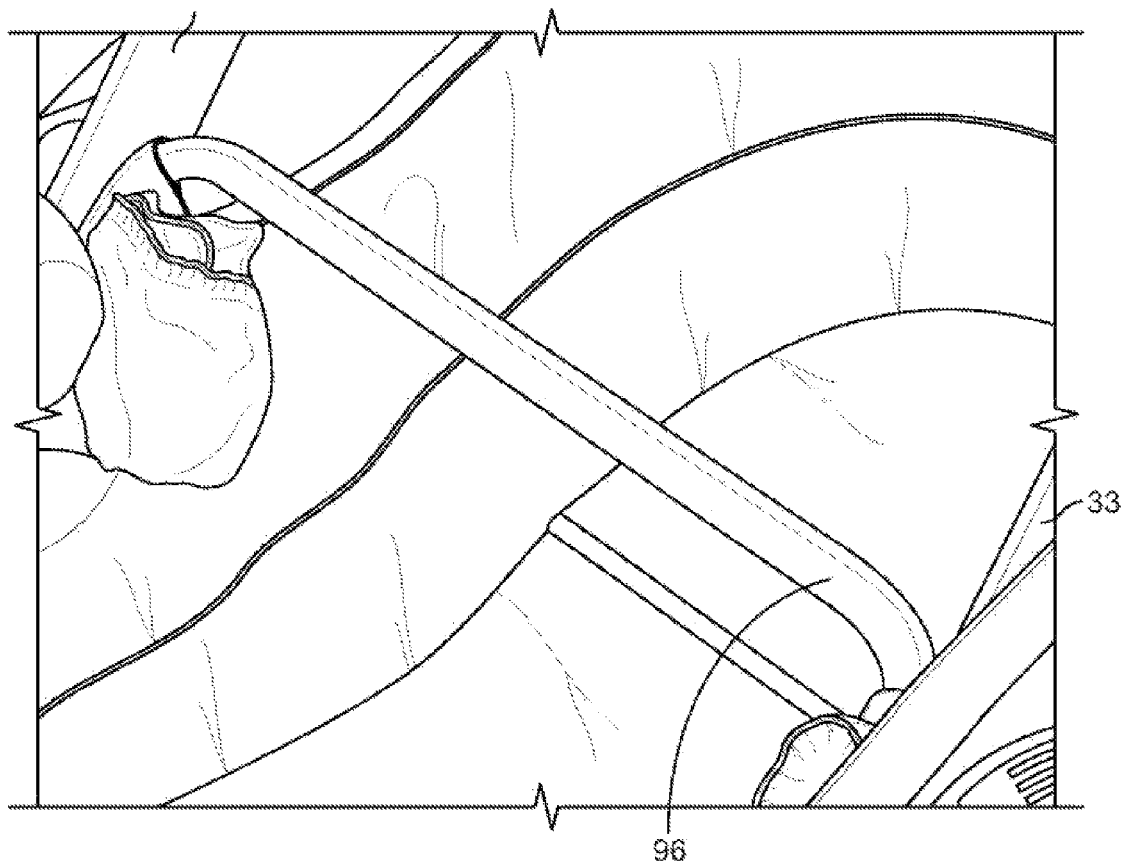
FIG. 5 is an enlarged view of an example cross-bar of the example stroller of FIG. 3.

FIG. 3 shows another example stroller 90 that includes an alternative example sit or stand structure 92 coupled to the seat support frame 33. The example stroller 90 of FIG. 3 includes a rear seat 94 that is coupled to the stroller 90 at a cross-bar 96 (FIGS. 4 and 5) and at the seat support frame 33 via one or more example joints 98. At the cross-bar 96, the seat 94 is removably coupled to the frame via a zipper 100. The zipper 100 is used to join fabric flanges that wrap around the cross-bar 96. When zipped, the flanges and zipper 100 secure the lower front portion of the seat 94 to the cross-bar 96. Although a zipper is shown in the illustrated example, in other examples any other suitable releasable fastener may be used such as, for example, snaps, clips, hooks, straps, Velcro®, etc.

Figure 6:
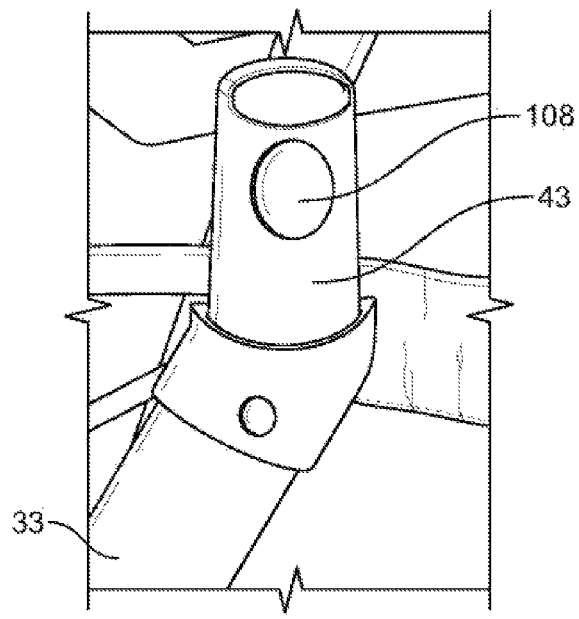
FIG. 6 in an enlarged view of an example mounting coupled to an example rear frame of the example stroller of FIG. 3.
Figure 7:
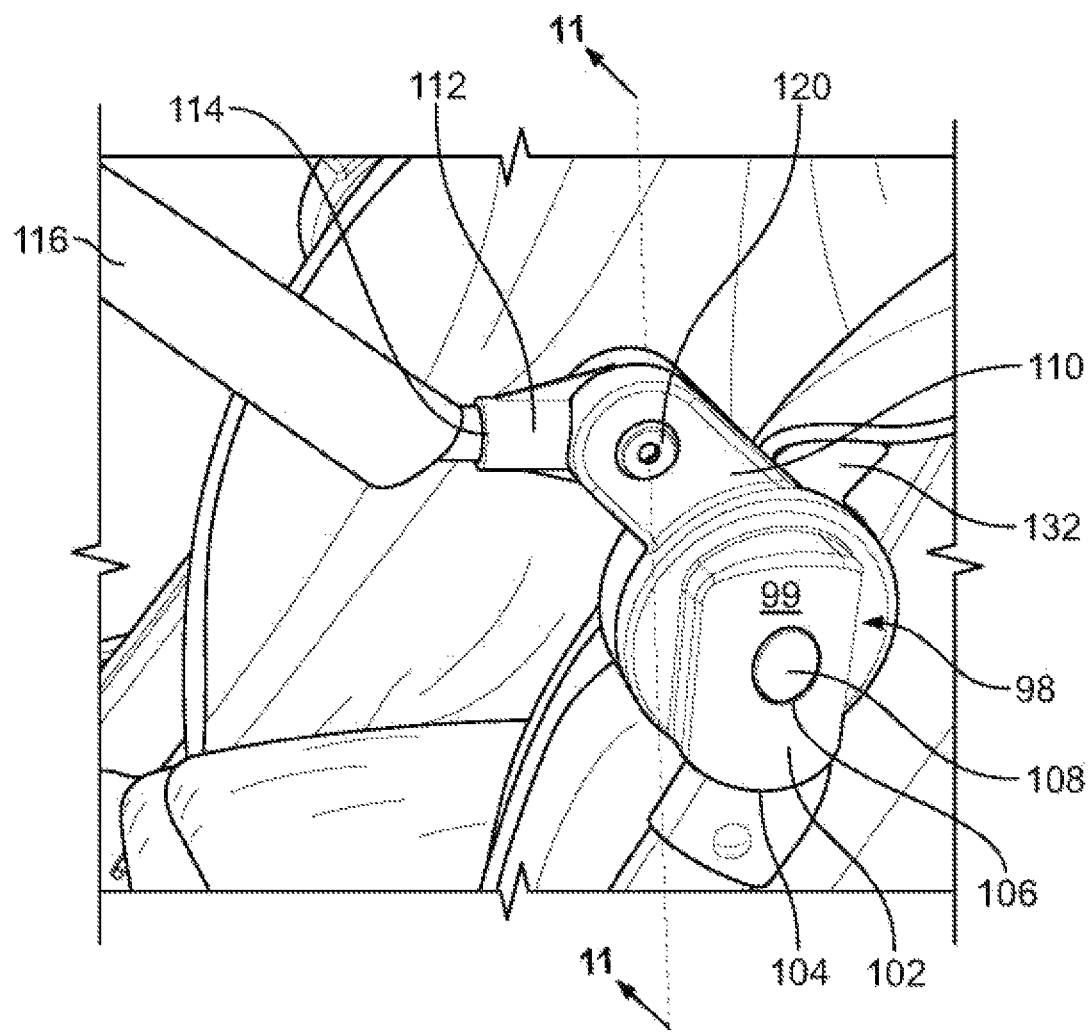
FIG. 7 is an enlarged view of an example joint of the example stroller of FIG. 3.
Figure 8:
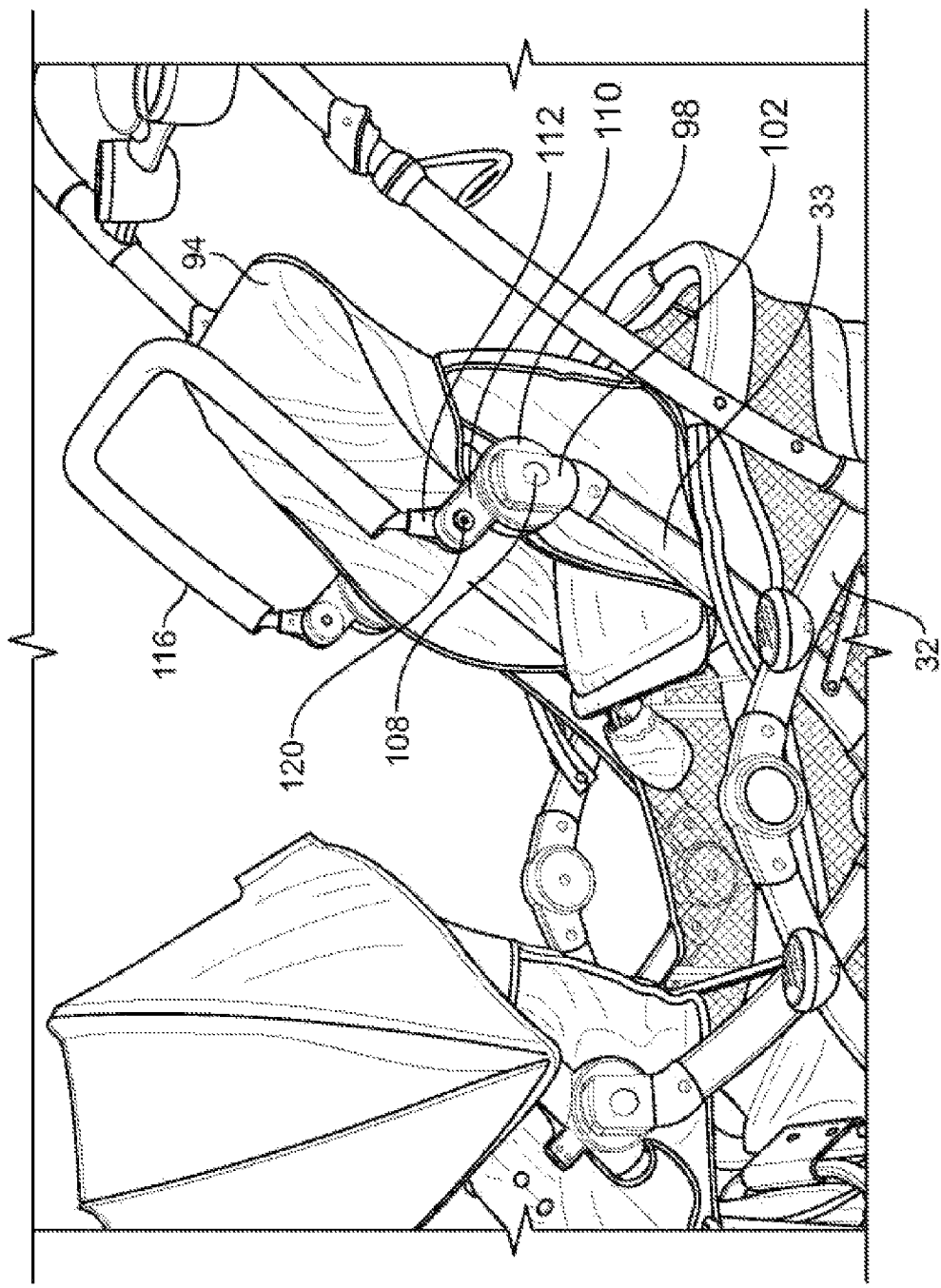
FIG. 8 a perspective view of a portion of the example stroller of FIG. 3 showing an example handle bar in a raised position.

FIGS. 6-11 show the seat 94 and/or sit or stand structure 92 mounted to the frame of the stroller 90 via first and second bayonet coupling mechanisms. For example, FIG. 6 illustrates a mount 43 that is coupled to an upper end of the seat support frame 33. In other examples, the mount 43 may be integral with the seat support frame 33. The mount 43 includes a button 108 (e.g., a spring-loaded button) or an extension in the form of a flange and living hinge, or any other suitable movable extension. When the sit or stand structure 92 is coupled to the seat support frame 33, the spring-loaded button 108 extends through an aperture 106 in a lateral extension 102 of an outer hub 99 of the joint 98, as shown in FIGS. 3, 7 and 8. The lateral extension 102 extends outwardly from the center of the stroller 90 on the outer hub 99 of the joint 98. The lateral extension 102 includes an opening 104, which attaches around the mount 43 of an upper end of the seat support frame 33. When the button 108 is actuated (e.g., depressed), the seat 94 including the joints 98 may be decoupled from the mount 43 and, thus, may be removed completely from the stroller 90 and optionally replaced with another structure (e.g., a storage basket, the sit or stand structure 40 of FIGS. 1 and 2, or any other suitable child care device). The mount 43 of FIG. 6 is also included with the example of FIGS. 1 and 2 and, thus, the receptacles 37 are provided with apertures sized and dimensioned to receive the spring-loaded buttons 108.

In other examples, the mount 43 and or the seat support frame 33 may include a plurality of spring buttons, pins, apertures, indentations, etc. to which the lateral extension 102 may be coupled. The plurality of buttons may be arranged along the mount 43 to enable the seat 94 to be raised or lowered along the seat support frame 33 to a desired height. When the seat 94 is in the desired position with respect to the seat support frame 33, the buttons associated with that position are released and the joints 98 are locked in the desired position. In examples in which there is only one button 108 on one of the mounts 43 of the stroller 90, the seat 94 may be adjusted and/or removed with one hand. Alternatively, there may be buttons 108 (and effectively locks) at both joints 98 for added security.

As shown in FIG. 7, each of the joints 98 also includes a joint extension 110. A pivot housing or rotatable extension 112 is disposed at the distal end of the extension 110 (FIGS. 7-11). The joint extension 110 may be coupled to or integral with the outer hub 99 or an inner hub 101 of the joint 98. In this example, the rotatable extensions 112 include an opening 114 into which a pivotable handle bar 116 extends. The handle bar 116 is movable between a raised position, as shown in FIG. 8, in which the handle bar 116 is raised toward the top of the seat 94 to enable a child to enter or exit the stroller 90, and a lower position as shown in FIG. 3 in which the handle bar 116 is disposed to the front of the seat 94 to encapsulate or substantially surround a seated or standing child in the stroller 90.

Figure 9:
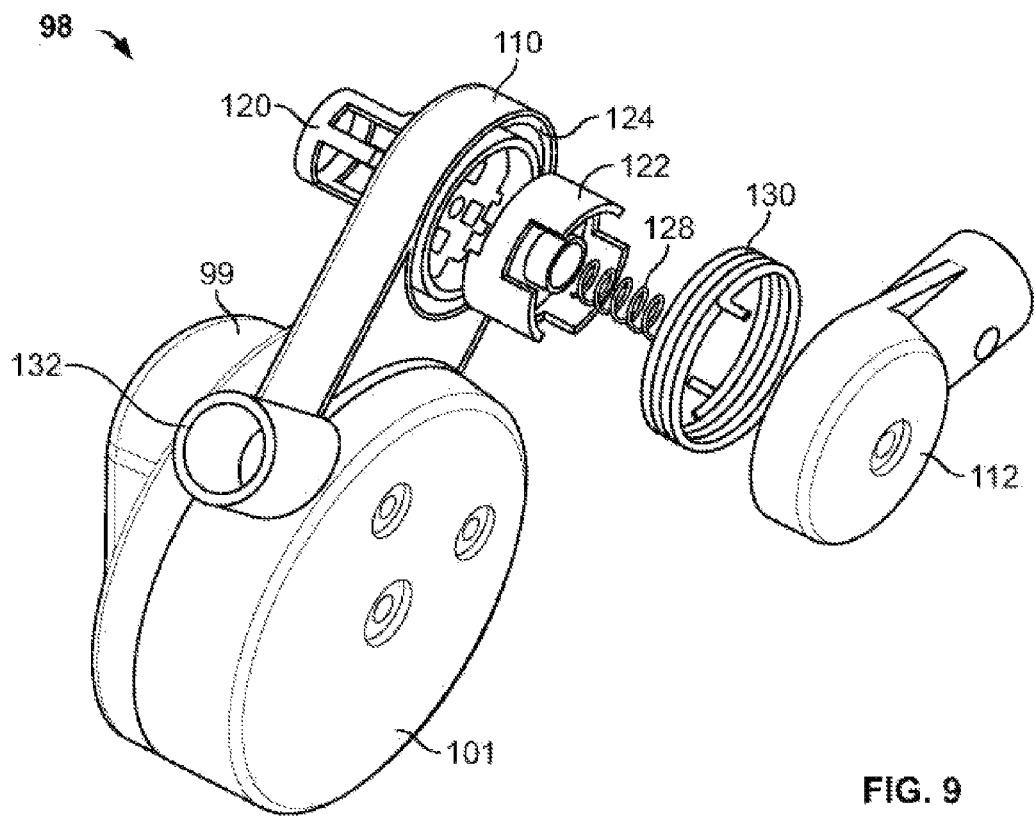
FIG. 9 is an exploded view of the example joint of FIG. 7.
Figure 10:
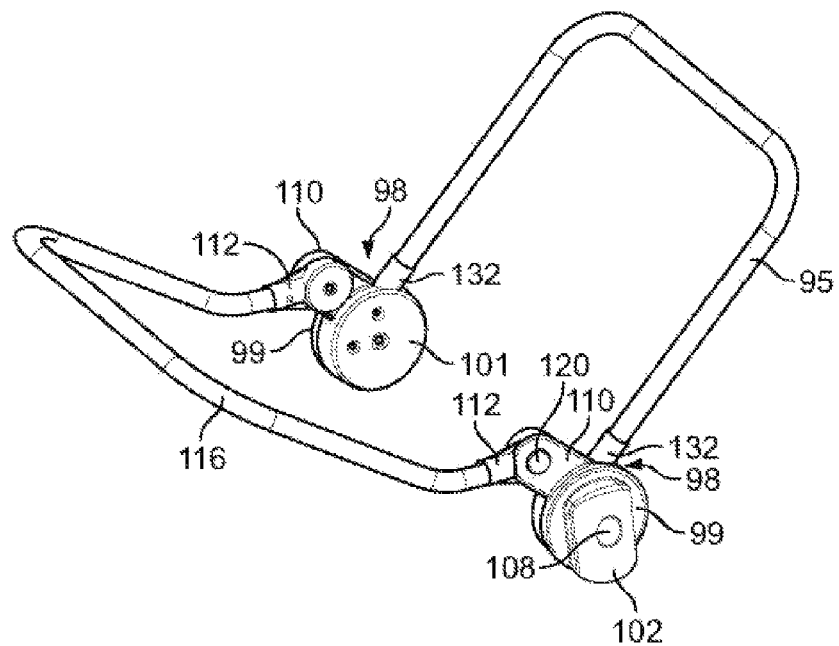
FIG. 10 is an isolated view of a portion of the example frame of the example stroller of FIG. 3.
Figure 11:
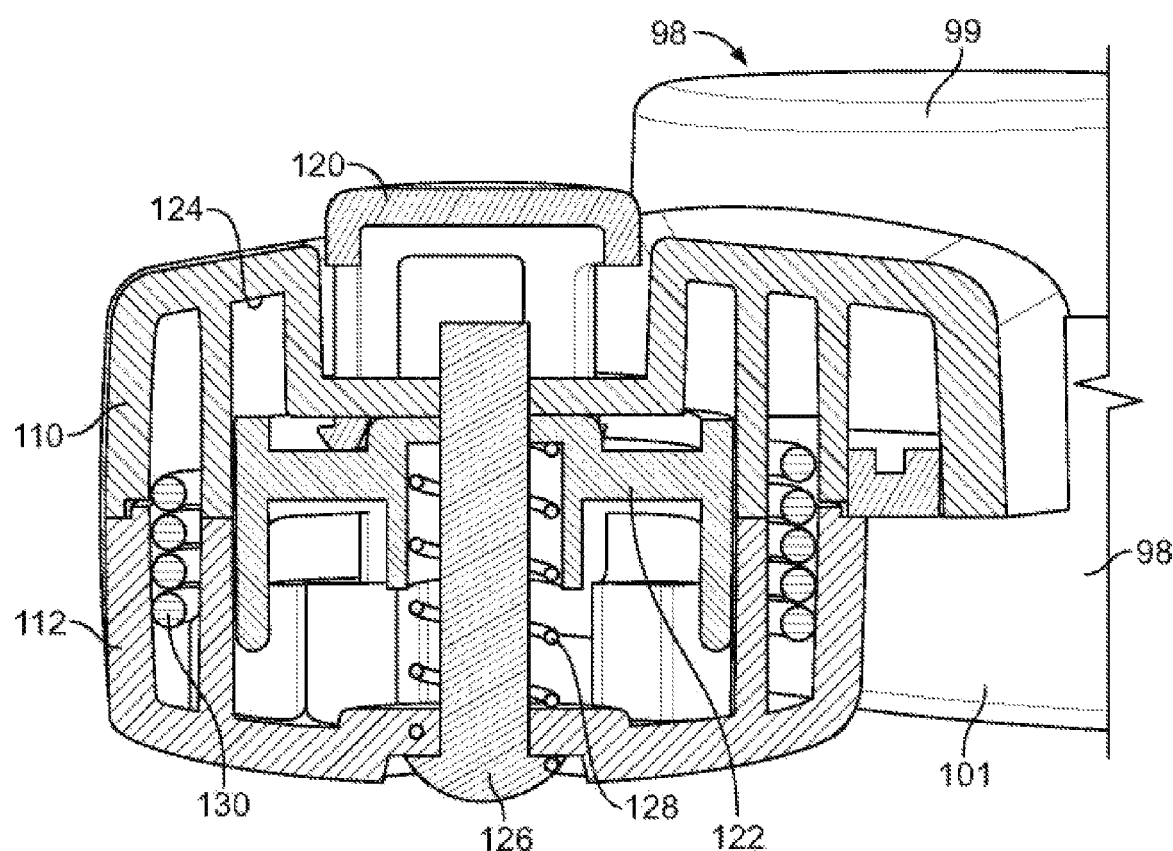
FIG. 11 is a cross-sectional view of a portion of the example joint of FIG. 7.

An example mechanism for rotating the handle bar 116 is shown in an exploded view in FIG. 9 and in a cross-sectional view in FIG. 11. The joint extension 110 includes a button 120 coupled thereto. The button 120 is selectively engageable with an inner latch 122 to cause the inner latch 122 to engage or disengage or further engage or further disengage an interior wall 124 of the joint extension 110 or the rotatable extension 112. The joint extension 110, inner latch 122 and rotatable extension 112 are coupled via a fastener 126 (see FIG. 11) such as, for example, a rivet or bolt or any other suitable fastener. When the button 120 is actuated, the button 120 forces the inner latch 122 away from the inner wall 124 of the joint extension 110 against the force of a spring 128 (which may be, for example, a compression spring) to release or disengage the inner latch 122 from the inner surface 124 of the joint extension 110. When the button 120 is actuated, the inner latch 122 and the rotatable extension 112 may be freely rotated between the lowered position of FIG. 3 and the raised position of FIG. 8. When the button 120 is released, the force from the spring 128 forces the inner latch 122 back into engagement with the inner wall 124 of the joint extension 110, which releasably locks the rotatable extension 112 in position with the joint extension 110.

When the inner latch 122 is disengaged from the inner wall 124 of the joint extension 110 and, thus, freely rotatable, the rotatable extension 122 is rotatable against the force of a spring 130, which may be, for example a torsion spring. The torsion spring 130 is operably coupled to the joint extension 110 and the rotatable extension 122. When the rotatable extension 112 is released (e.g., when a user releases the handle bar 116, as described herein), the torsion spring 130 causes the rotatable extension 112 to rotate and return to the lowered position shown in FIG. 3. Consequently, the handle bar 16 is biased to the lowered position and, therefore, the handle bar 116 will automatically close (e.g., enter the default position) to encapsulate or substantially surround a child occupying the sit or stand structure 92 of the stroller 90.

As described above, the handle bar 116 is coupled to the rotatable extension 112. In particular, the handle bar 116 is inserted into or otherwise engages the opening 114 (FIG. 7) in the rotatable extension 112. Thus, upon actuation of the button 120, the handle bar 116 may rotate between the lowered position, which encapsulated the child occupant, and the raised position, which facilitates access into or out of the stroller 90, as described above. Furthermore, the example stroller 90 may include a single button 120 on one side of the stroller 90 to enable one-handed rotation of the handle bar 116. In other examples, however, there may be a button 120 on each side of the stroller 120, and actuation of both buttons may be required to enable rotation of the handle bar 116.

The joints 98 also include a stationary extension 132 to which a seat frame 95 of the seat 94 is couplable. In the example shown, a u-shaped tube forms the seat frame 95. The seat frame 95 forms the back and head support portions of the seat 94. In other examples, the seat frame may be any other shape, may include any number of components and/or may be arranged in any suitable configuration to provide a seat back support. Furthermore, in some examples the stationary extension 132 may be replaced with a second rotatable extension to enable the seat back to recline to a desired position. Such a rotatable extension that enables reclining of the seat back may operate in a manner similar to the rotatable extension 112 that enables rotation of the handle bar 116.

Figure 12:
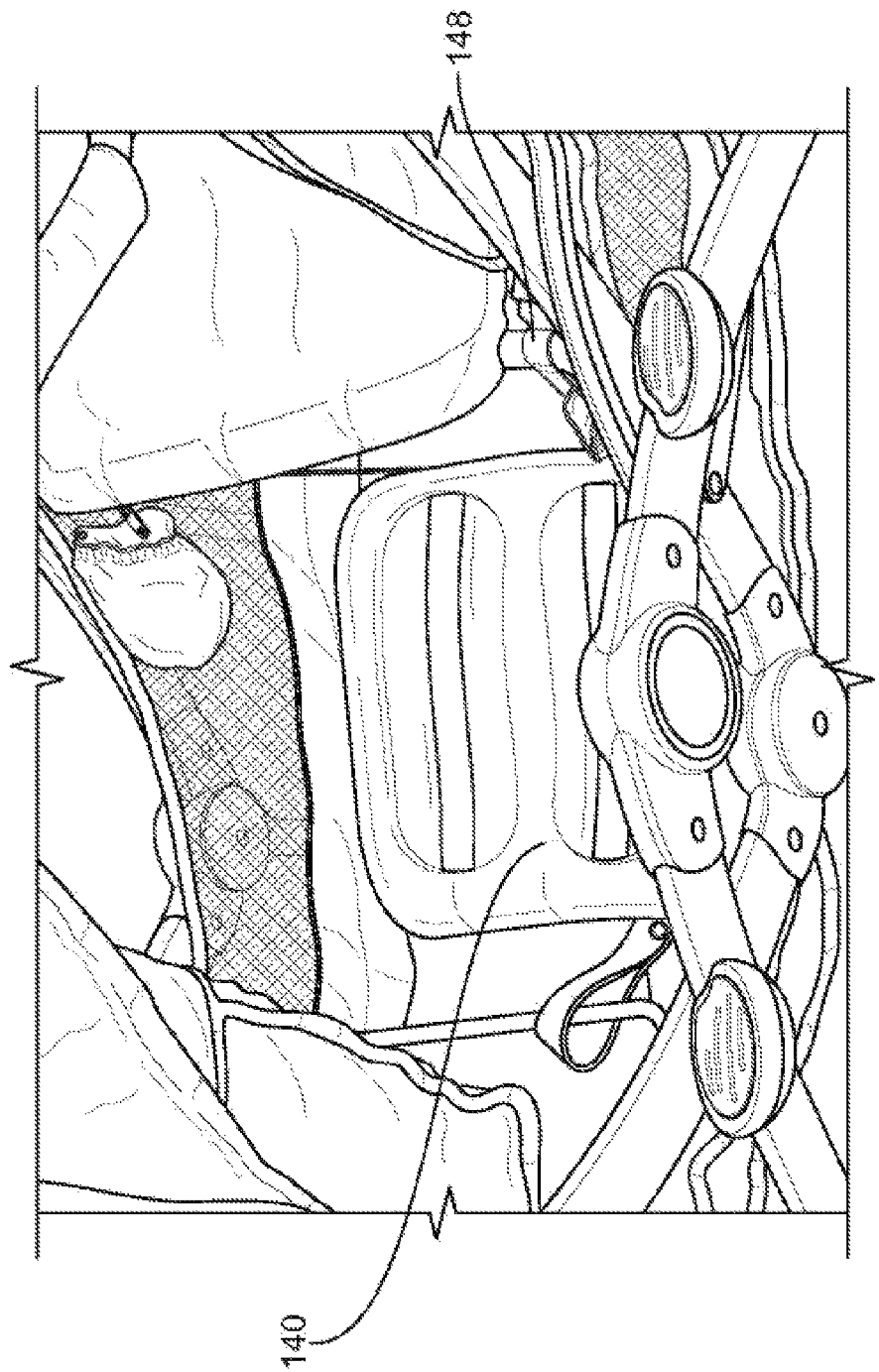
FIG. 12 is a top view of an example foot platform.
Figure 13:
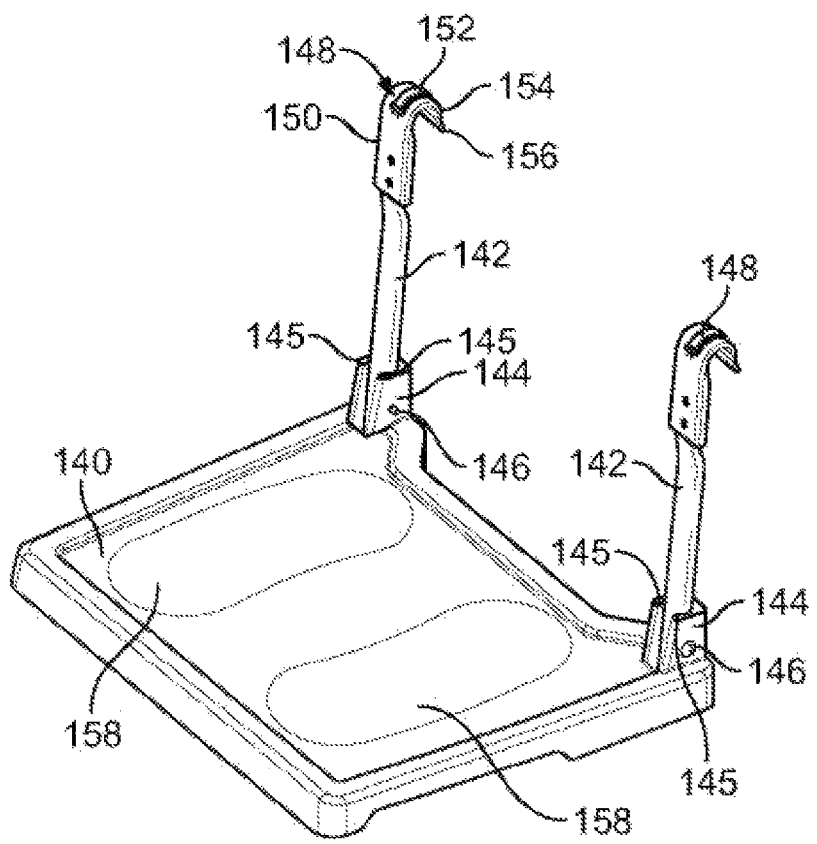
FIG. 13 is an isolated view of the example foot platform of FIG. 12 in an extended position.
Figure 14:
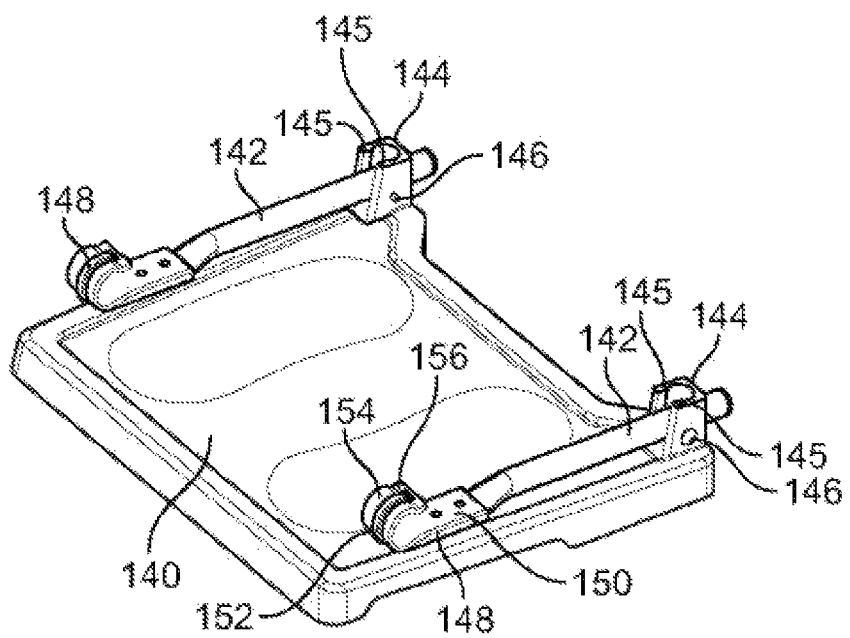
FIG. 14 is an isolated view of the example foot platform of FIG. 12 in a folded position.

The example stroller 90 also includes a removable foot platform 140 as shown in FIGS. 12-14. The foot platform 140 supports the weight of a child that is either climbing into the stroller 90 to sit in the seat 94 or that is standing on the foot platform 140 and, perhaps, holding the handle bar 116, while the stroller 90 is in use. The foot platform 140 is coupled to the lower ends of two foldable legs 142, which are shown in FIG. 13 in an extended or deployed position for use in the stroller 90 and in FIG. 14 in a folded or stowed position for storage. In the illustrated example, the legs 142 are each coupled to a stand 144 via a pivot pin 146 that enable the legs to rotate between the extended and folded positions. In other examples, the legs may telescope, may be stationary, may include a plurality of folds and/or may otherwise retract. The stands 144 include two fingers 145 that are separated a distance less than the diameter or width of the legs 142. When the legs 142 are moved from the folded position to the extended position, the legs 142 snap into the stands 144 and the fingers 145 hold the legs 142 in the extended position. To fold the legs 142, the user pushes the legs 142 past the fingers 145 and out of the stand 144. In the illustrated example, the stroller 90 may be folded into a storage position without removing the foot platform 140. When the stroller 90 is folded, the platform 140 pivots upward to a folded position.

Each of the legs 142 also includes a hook 148 to couple the foot platform 140 to the cross-bar 96 of the stroller. However, in other examples, any other clip, strap or other suitable fastener may be used additionally or alternatively to the hooks 148. The hooks 148 include a first wall 150, a second wall 152, a third wall 154 and a grip 156. One or more of the first wall 150, the second wall 152, the third wall 154 and/or the grip 156 may be integrally formed. In the illustrated example, the first wall 150 is coupled to the legs 142. The second wall 152 is coupled to the first wall 150 and extends in an arc away from the legs 142 to the third wall 154. The third wall 154 curves back inward toward the first wall 150 so that the distance between the lower portion of the third wall 154 and the first wall 150 is less than the diameter or width of the cross-bar 96 of the stroller. This provides a secure connection of the foot platform 140 with the cross-bar 96. The third wall 154 is coupled to the grip 156, which may be used to pull the third wall 154 away from the first wall 150 to increase the distance between the third wall 154 and the first wall 150 and, thus, to facilitate the removal of the foot platform 140 from the cross-bar 96.

The example foot platform 140 also includes one or more grip areas 158 that may provide traction for a child standing thereon. The grip areas 158 may include a grip tape, a textured surface, a fabric or any other suitable traction providing surface. Furthermore, in some examples, the foot platform 140 may rest on other frame components of the stroller 90. In other examples, the foot platform 140, legs 142 and hooks 148 may be made of a material of suitable mechanical strength to support a child without relying on other frame components of the stroller 90 for additional mechanical support.

Figure 15:
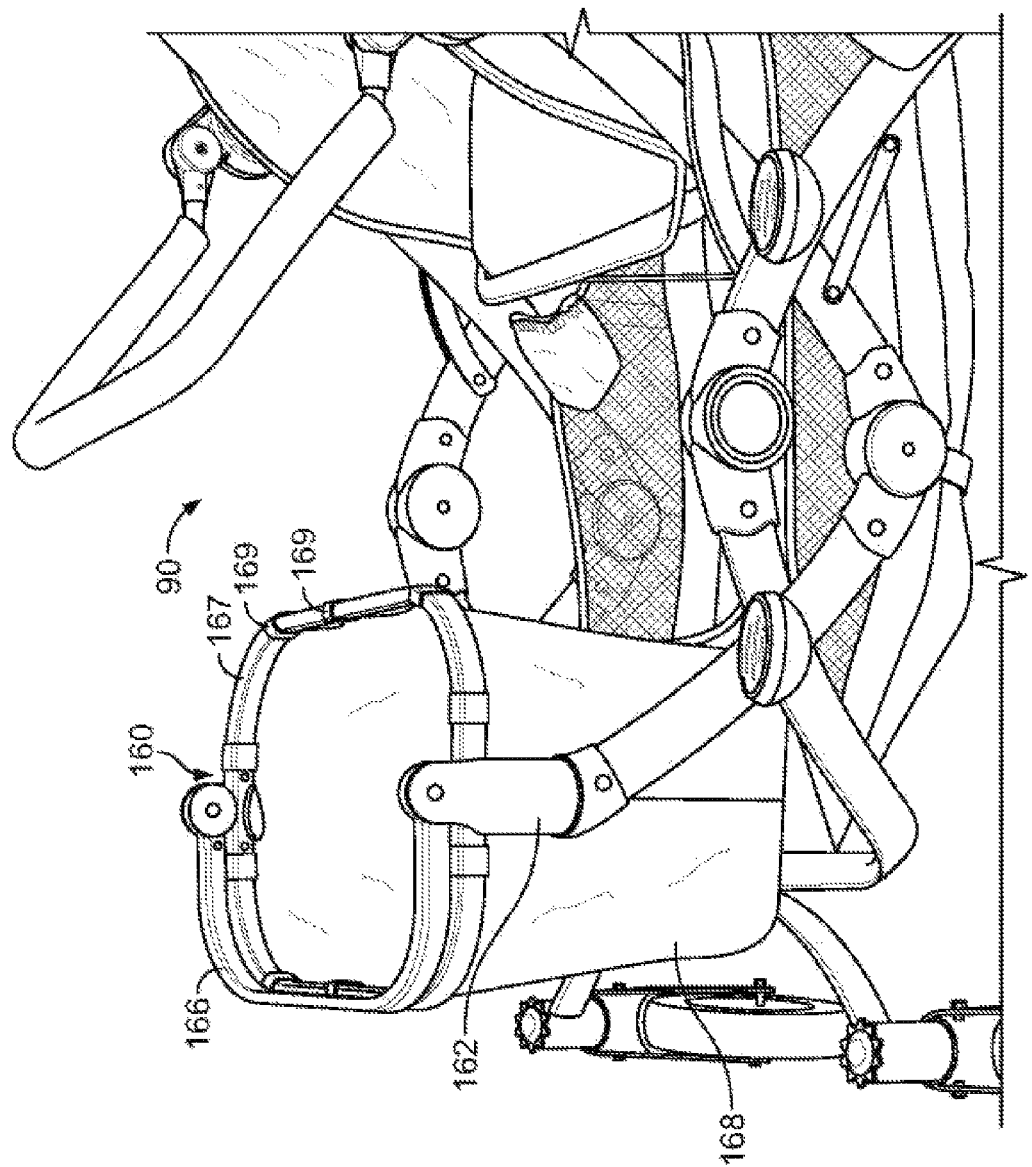
FIG. 15 is side view of a portion of the example stroller of FIG. 3 with an example basket.
Figure 16:
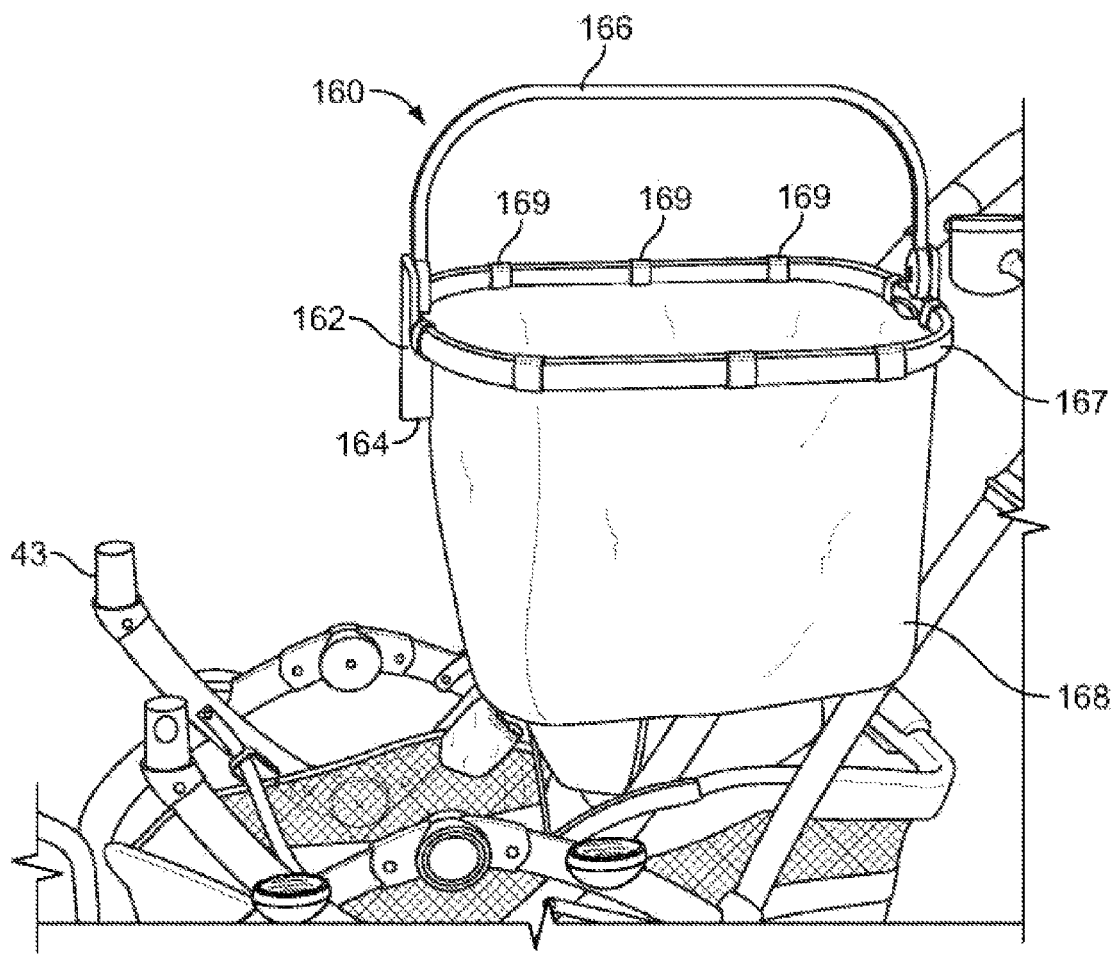
FIG. 16. is a view of the example basket of FIG. 15 separated from the example stroller.

FIGS. 15 and 16 show an alternative example in which a first seat 93 has been removed from the front mounts 43 of the seat support frame 33 of the stroller 90 and a storage basket 160 has been coupled to the mounts 43. In this example, the storage basket 160 includes a joint 162 that includes a receptacle 164 through which the basket 160 is releasably couplable to the mount 43. The mount 43 of the example of FIGS. 15 and 16 is similar to and operates in a similar way as the mount 43 of FIGS. 6-8. Thus, the mount 43 includes a spring-loaded button 108. The button 108 may be actuated to remove the basket 160 (FIG. 16). In other examples, the joint 162 and the mount 43 are not lockably engageable and, therefore, the basket 160 may be removed with one hand simply by lifting the basket 160 from the stroller 90 without actuation of any other components.

The basket 160 of the illustrated example includes a handle 166 that includes detents (not shown) which enable the handle 166 to be locked in a vertical position (FIG. 16) for carrying and in a horizontal position (FIG. 15) for storage on the frame 35. In the illustrated example, the handle 166 is a bent steel tube. In other examples, the handle 166 may be one or more components of any suitable material.

The basket 160 of the illustrated example includes a top frame 167 to which a fabric enclosure 168 is coupled. The frame 167 in this example is an oval shape and comprises two separate tubes that are coupled together. In other examples, the frame 167 may be any suitable shape and may comprise an integral tube or any number of components. Further, the handle 166 and the frame 167 are coupled to the joint 162 via rivets and/or any other suitable fastener. Also, in this example, the fabric enclosure 168 is coupled to the frame 167 via a plurality of straps 169. However, in other examples, the fabric enclosure 168 may be coupled to the frame 167 via any suitable mechanical or chemical fastener(s).

Figure 17:
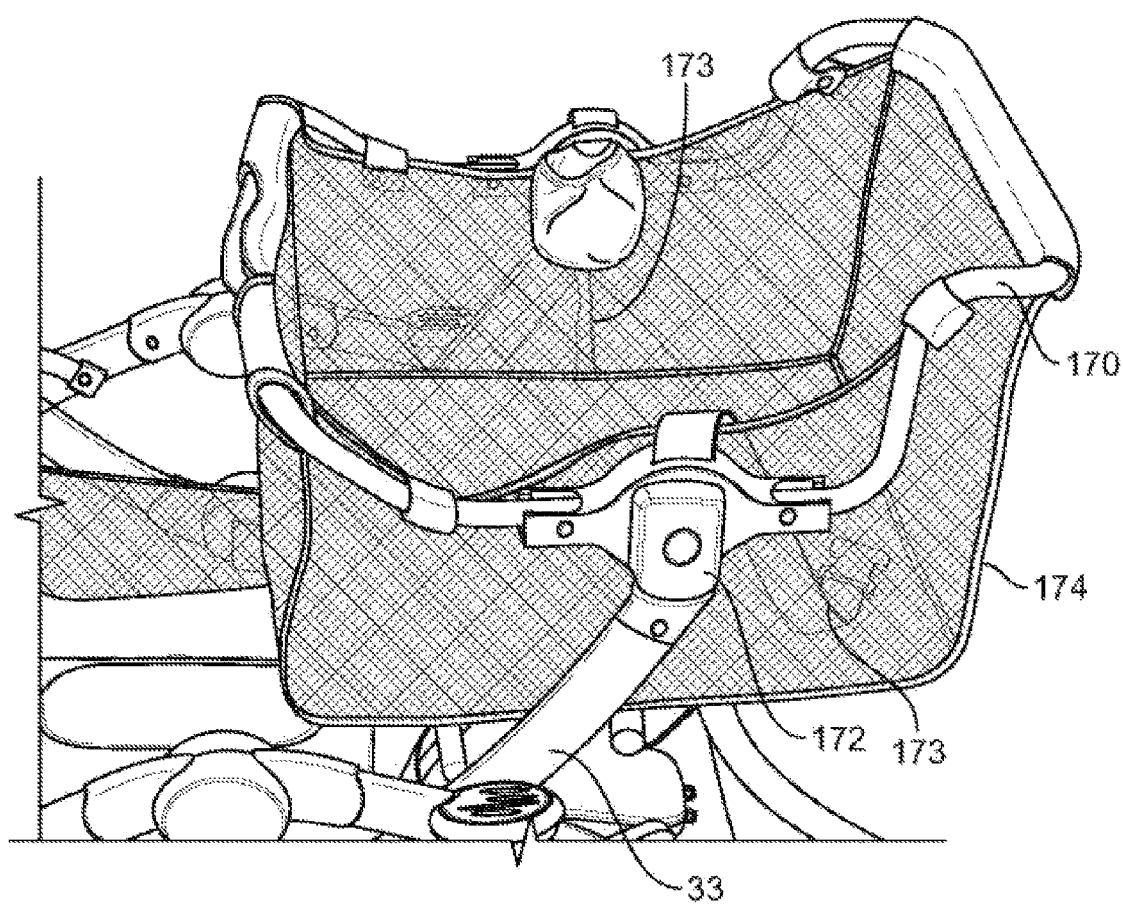
FIG. 17 is a front view of a portion of the example stroller of FIG. 3 with an example car seat adapter.

FIG. 17 shows an alternative example in which an example car seat adapter 170 is coupled to the front frame 35 of the stroller 90. The example car seat adapter 170 may be used to couple a car seat (not shown) to the stroller 90 by securing the car seat to the adapter 170 using straps 173. The straps 173 may be coupled to joints 172 or to any other part of the structure. In addition, in the illustrated example, a fabric enclosure 174 is coupled to the car seat adapter 170 to provide additional storage space. The straps 173 are releasably couplable to each other and may be used, where no car seat is present, as a handle for the fabric enclosure. In the examples describes herein the accessories (e.g., the sit or stand structure 92, basket 160 and/or car seat adapter 170) are interchangeably couplable to the stroller 90. Further, the accessories are couplable to the stroller 90 via first and second bayonet coupling mechanisms, as described herein.

Figure 18:
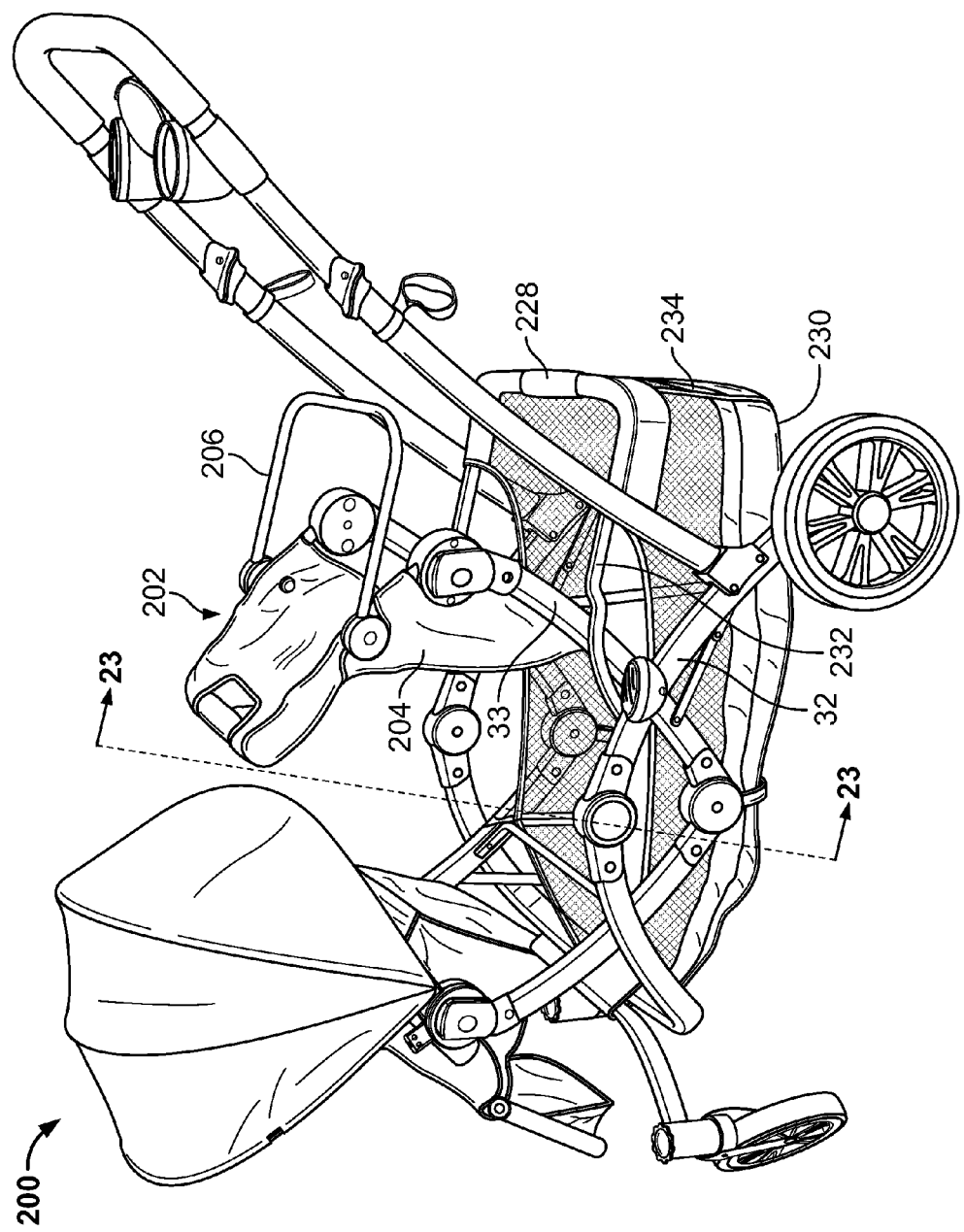
FIG. 18 is a perspective view of an alternative example stroller having an alternative example sit or stand support showing an example handle bar in a lowered position.

FIG. 18 shows another example stroller 200 that includes an alternative example sit or stand structure 202. In this description, and throughout the examples described in this specification, similar numbers will be used to describe similar structures. Furthermore, some of the structures that are described above with other examples, will not be described again with respect to the examples of FIGS. 18-24.

The example sit or stand structure 202 of FIG. 18 is similar to the sit or stand structure 92 of FIG. 3 and couples to the example stroller 200 in the same manner as the example sit or stand structure 92 couples to the example stroller 90. However, in the example of FIG. 18, the sit and stand structure 202 includes a seat 204 that faces rearward or toward an adult pushing the stroller 200. Thus, a child occupying the sit or stand structure 202 in a seated position would face rearward toward an adult pushing the stroller 200, and a child occupying the sit or stand structure 202 in a standing position (FIG. 19) could face forward or rearward. Furthermore, in this example, the child enters the example sit or stand structure 202 from the rear of the stroller 200.

Figure 19:
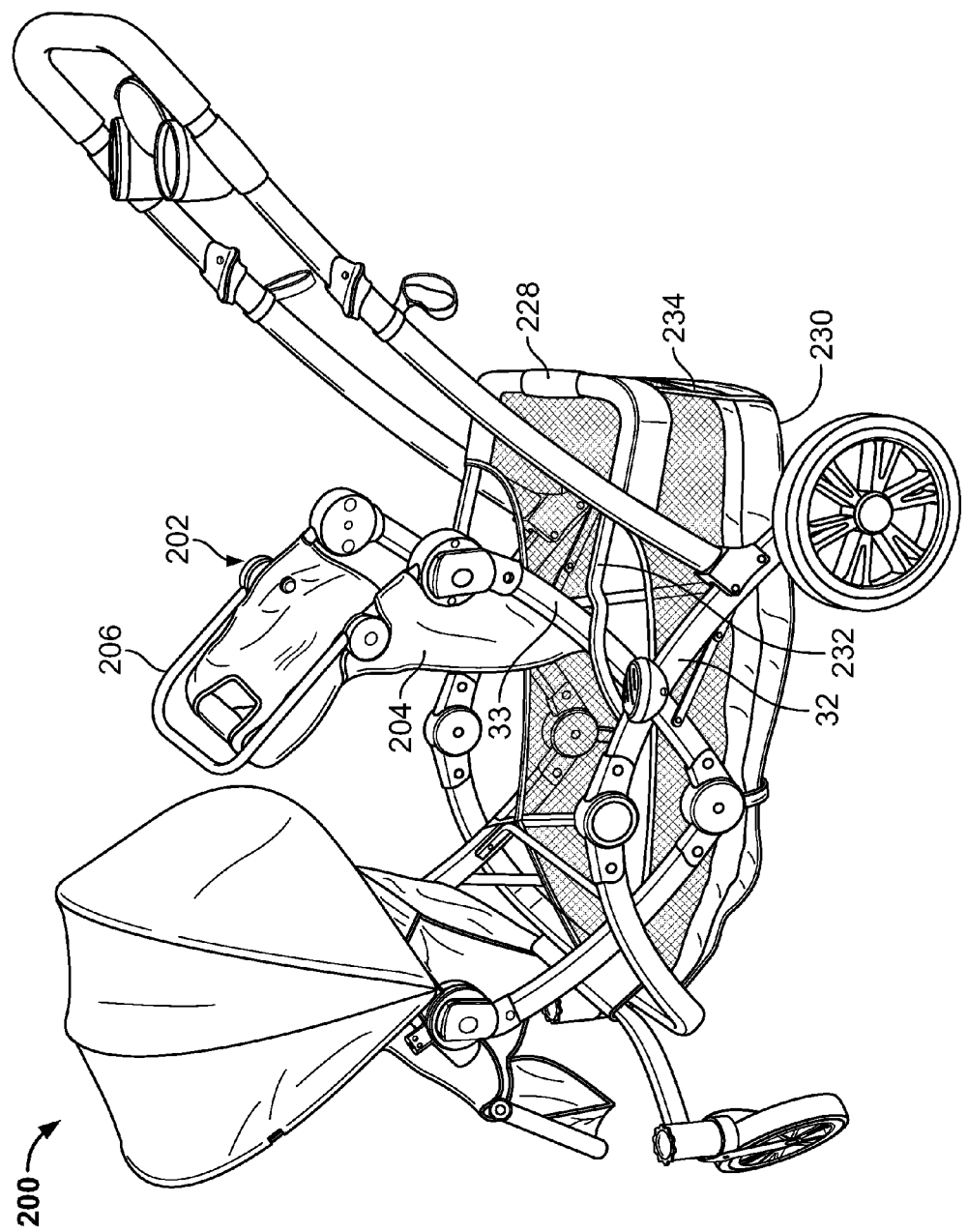
FIG. 19 a perspective view of a portion of the example stroller of FIG. 18 showing the example handle bar in a raised position.

The example sit or stand structure 202 of FIG. 18 includes an example handle bar 206 that is pivotable between a lowered position (FIG. 18) and a raised position (FIG. 19). In the lowered or seated position, the handle bar 206 secures a child occupant that is seated in the sit or stand structure 202, as described above. In the raised or standing position, the handle bar 206 is clear from an area occupied by the child and facilitates entry of the child onto the sit or stand structure 202

(or exit from the sit or stand structure 202). The handle bar 206 may be moved to the raised position when a child is entering the sit or stand structure 202 to occupy the seat 204 in a seated or standing position. The handle bar 206 is moved between the raised or lowered position via a pivot joint and locks downward as described above in other examples.

Figure 20:
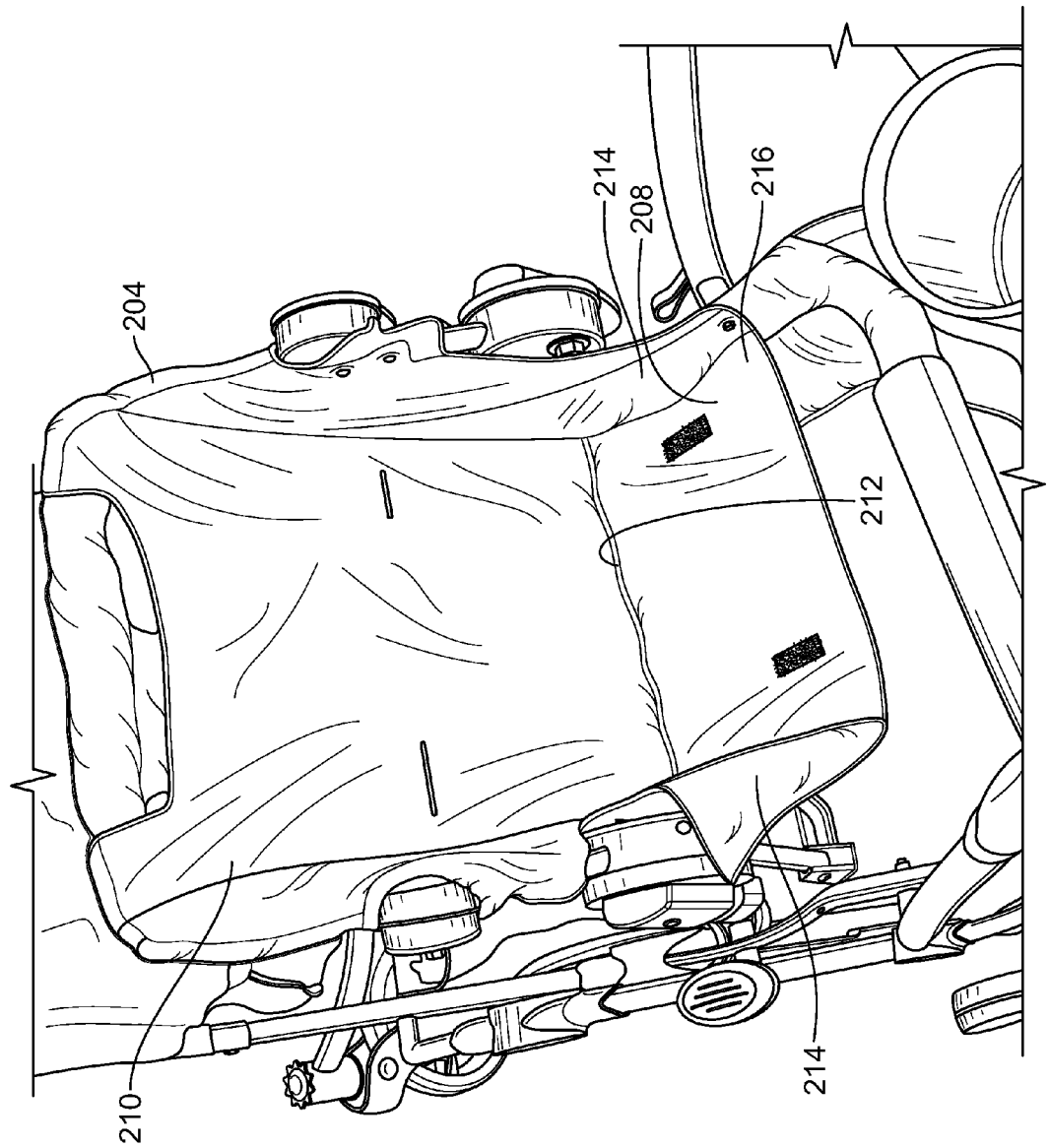
FIG. 20 is a perspective view of a portion of the example stroller of FIG. 18 with an example seat pan in a lowered position and the handle bar removed.
Figure 21:
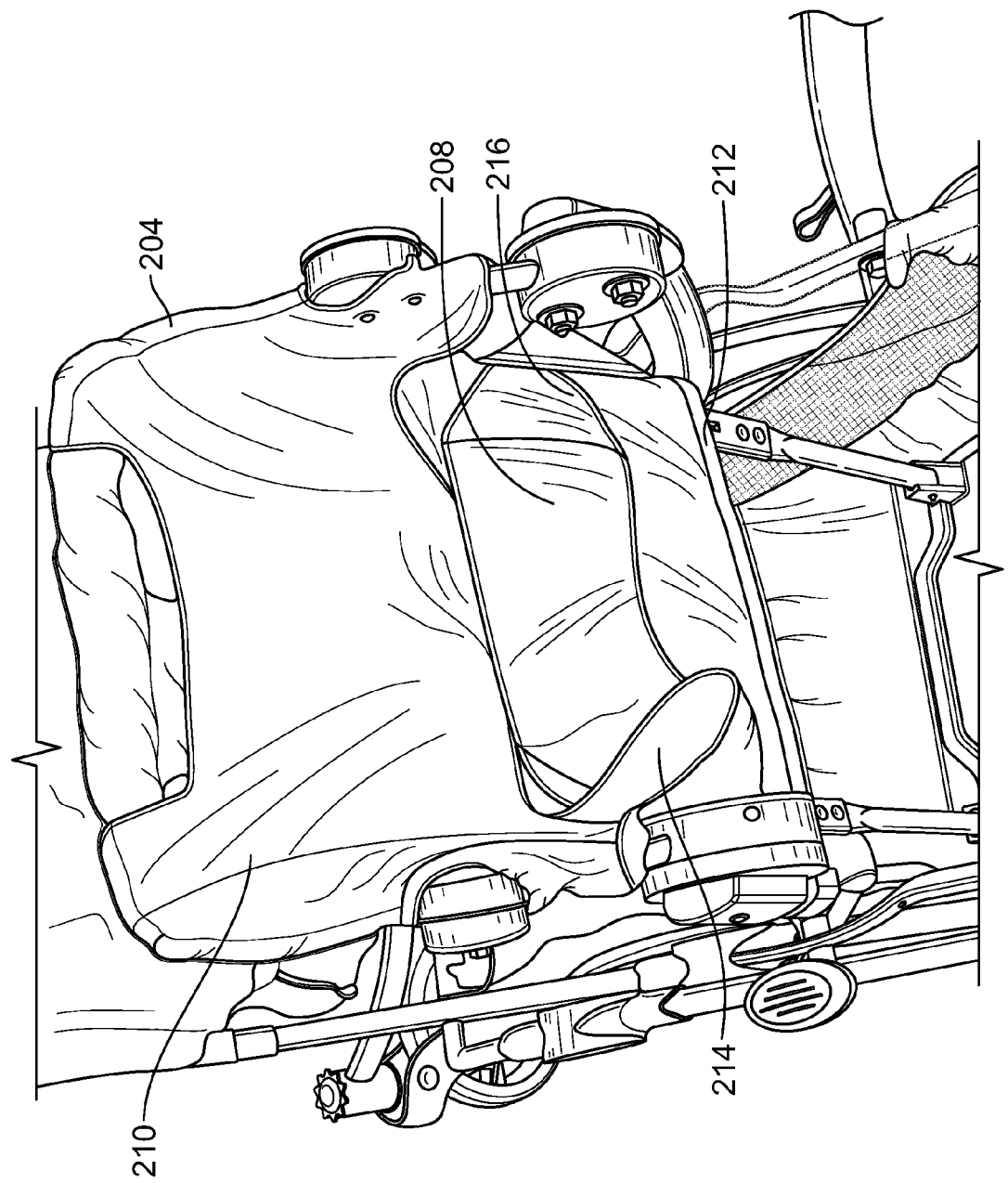
FIG. 21 is a perspective view of a portion of the example stroller of FIG. 18 with the example seat pan in a raised position and the handle bar removed.
Figure 22:
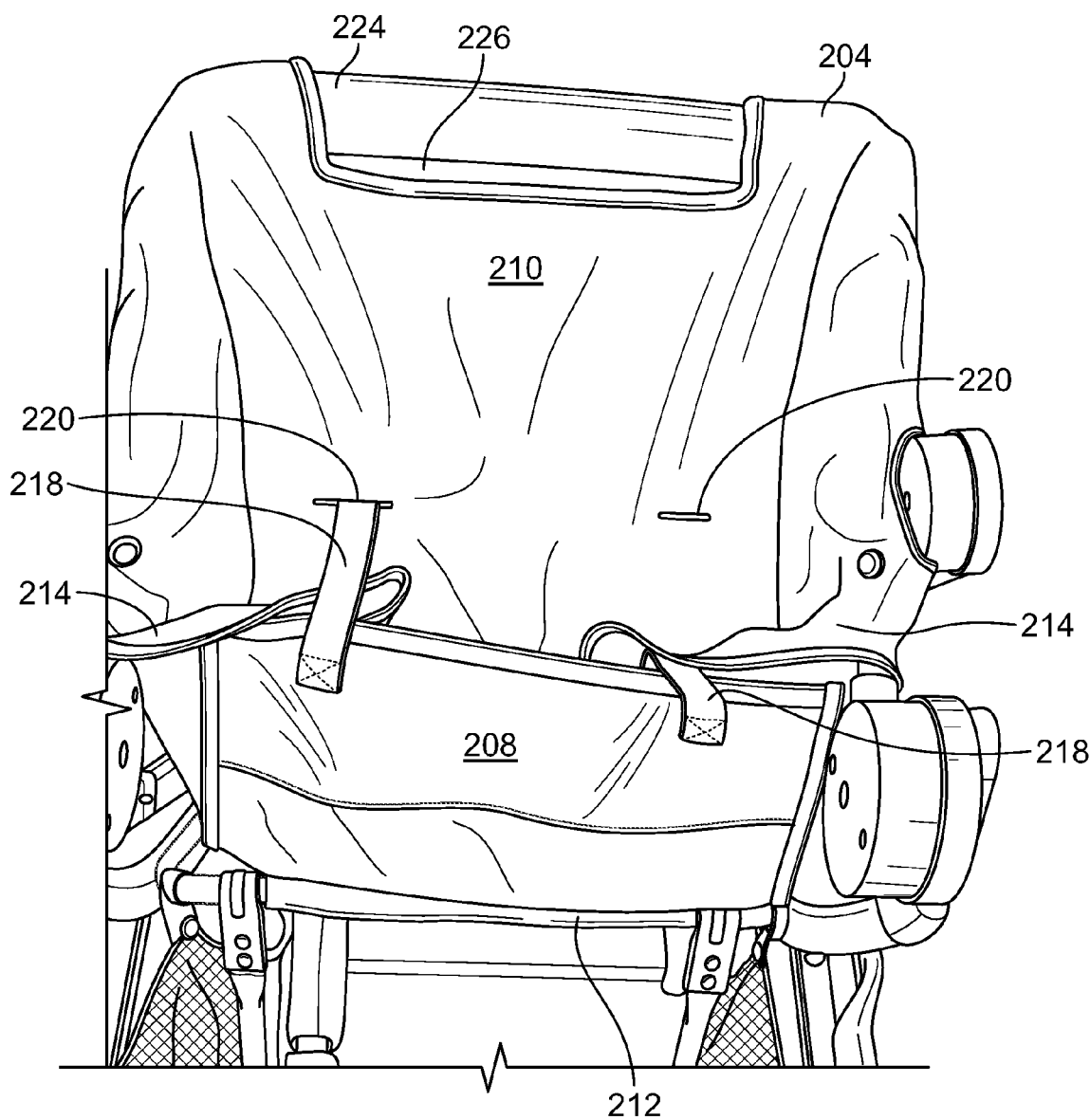
FIG. 22 is an enlarged view of the portion of the example sit or stand support showing example straps to hold the seat pan in the raised position.

FIGS. 20-22 show the seat 204 portion of the example sit or stand structure 202 stroller of FIG. 18 with the handle bar 206 removed for clarity. The seat 204 includes a seat pan 208 and a seat back 210. The seat pan 208 is coupled to the seat back 210 via a pivotable hinge 212 and two side panels 214. In the illustrated example, the seat pan 208 includes a central stiffening board that may be covered with a soft goods (e.g., a foam padding) and then covered with a fabric covering 216. The seat pan 208 is rotatable about the pivotable hinge 212 between a lowered or seat position (FIG. 20) and a raised or standing position (FIG. 21). To move the seat pane 208 between the lowered and raised positions, the user grabs a portion of the seat pan 208 and raises or lowers it. In the process, the side panels 214, which are freely collapsible, move between an extended or deployed position (when the seat pan 208 is lowered) and a folded or collapsed position (when the seat pan is raised). In the lowered position, the seat pan 208 serves as a support surface for a child occupying the sit or stand structure 202 in a seated position. In the raised position, the seat pan 208 clears the area occupied by the child to enable the child to stand in the sit or stand structure 202 without obstruction from the seat.

FIG. 22 illustrates an example mechanism for securing the seat pan 208 in the raised position. The seat 204 includes one or more straps 218 that are coupled, for example, to the seat pan 208. In the illustrated example, the example straps 218 are coupled to a rear of the seat pan 208. In other examples, the example straps 218 may be coupled to an interior of the seat pan 208, to a top of the seat pan 208, to the side panels 214, to the seat back, to the frame 19, 20 of the stroller 200 and/or in any other suitable position. Furthermore, there may be any number (e.g., 1, 2, 3, 4, etc.) of example straps 218. The straps 218 are couplable to the seat back 210 to hold the seat pan 208 in the raised position. In the illustrated example, the example straps 218 are coupled to the seat back 210 via one or more slots 220 in the seat back 210, which is also covered in the example fabric 216. The example straps 218 may be loop and hook fasteners (e.g., Velcro® fasteners), snap fasteners or any other suitable releasable mechanical fastener(s).

Figure 23:
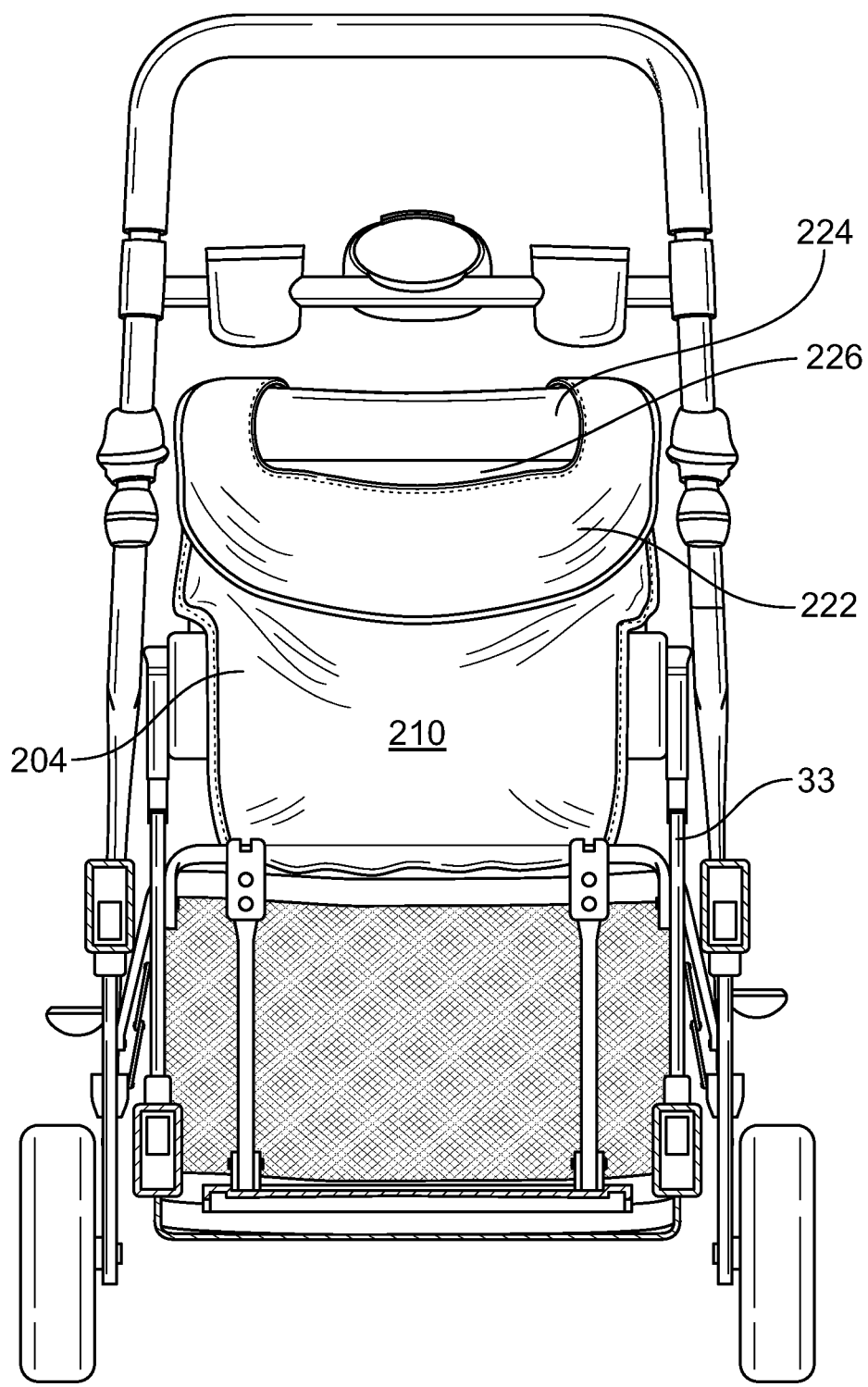
FIG. 23 is a cross sectional view of the example stroller of FIG. 18 taken along the 23-23 line of FIG. 18 showing a side of the example sit or stand support facing the center of the stroller.
Figure 24:
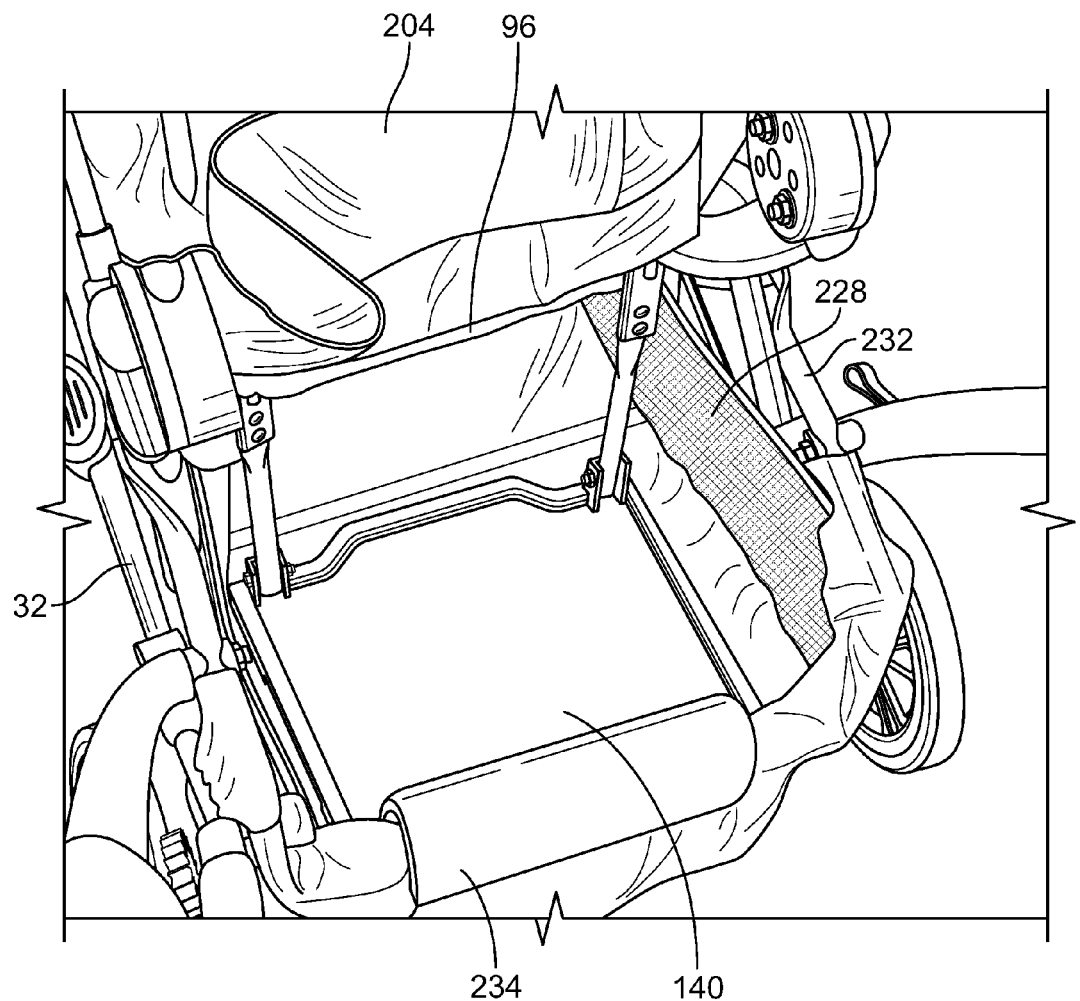
FIG. 24 is a perspective view of a portion of the example stroller of FIG. 18 showing an example footrest, example step and example storage compartment.

FIG. 23 is a cross sectional view of the example stroller 200 of FIG. 18 taken along line 23-23 of FIG. 18 showing a side of the example sit or stand support 202 facing the center of the stroller 200. Thus, the rear side of the seat back 210 (i.e., the side toward the center of the stroller 200) is shown. The example seat back 210 includes an upper or headrest portion 222, which, in some examples includes additional padding, a contoured shape, adjustable right and left head support wings, headrest height adjustment mechanisms, and/or a fabric covering of the same or different material as the fabric cover 216. In addition, in the illustrated example, the seat back 210 includes an example standing grip 224 and grip slot 226. When a child occupies the example sit or stand structure 202 in the standing position, the child may grasp the standing grip 224, which may include, for example, disposing the child's fingers and/or hand through the grip slot 226 to support the child in the standing position, for example, when the stroller is in motion. In other examples, there may be one or more standing grips located on the sides of the seat back 210 and/or elsewhere on the example sit or stand structure 202 and/or the example stroller frame 19, 20.

The example stroller 200 also includes an example storage compartment 228. The example storage compartment 228, in this example, is an open-top basket comprised of fabric side panels 230 that may be, for example, mesh panels. The storage compartment 228 also includes a top frame 232, which is pivotably coupled to the frame 19, 20 of the stroller 200, and a step 234. The user may press the example step 234 to move the example stroller 200 between an open or in-use position and a folded or storage position. When the step 234 is pressed downward, the top frame 232 of the storage compartment 228 rotates with respect to the stroller frame 19, 20 to move the stroller 200 from the open position to the folded position. The step 234 and the top frame 232 may also include a locking feature to lock the step 234 and the top frame 232 with respect to the stroller frame 19, 20. With the locking feature, the user is required to actuate a release in addition to the step 234 to move the stroller 200 from the open position to the folded position. In addition, with the locking feature, the step 234 will remain stable upon the application of a downward force if the release has not been actuated. Thus, a child climbing into or out of the example stroller 200 will not cause the example stroller 200 to collapse unintentionally.

The example storage compartment 228 also includes an example foot platform 140, which is discussed above. However, in the example shown in FIG. 24, the example foot platform 140 is coupled to the cross-bar 96 (FIGS. 5, 24) in the opposite direction than described above in the example stroller 90. As a result, the foot platform 140 faces toward the rear of the example stroller 200. The foot platform 140 supports the weight of a child entering or exiting the example stroller 140 or while the child occupies the example sit or stand structure 202 in the standing position.

In use, a user of the example strollers 10, 90, 200 described herein may remove one or more of the first seat 26, 93 and/or the second seat 58, 94, 204 from the stroller 10, 90, 200. The user may mount one of the accessories 40, 92, 160, 170, 202, in place of one of the first or second seats 26, 58, 93, 94, 204. In some examples, the accessory 40, 92, 202 includes the third seat 58, 94, 204 and the platform 82, 140. The platform 82, 140 provides the standing surface for a stroller occupant whereby the stroller occupant can selectively stand on the standing surface 82, 140 or sit on the third seat 58, 94, 204. In addition, the user may pivot a handle 54, 56, 116, 206 to a position substantially surrounding an area above the platform 82, 140 to provide a gripping surface for the occupant when standing on the standing surface 82, 140. Also, as described above, other accessories 40, 92, 160, 170, 202 such as, for example, a basket 160, 170 and/or a car seat adapter 170 may be mounted to the stroller 10, 90, 200 in place of at least one of the first, second or the third seats 26, 58, 93, 94, 204 or in place of the other of the basket 160, 170 or the car seat adapter 170.

To manufacture the example strollers 10, 90, 200 described herein, the wheeled frame 19, 20 is provided with the removable seat 26, 58, 93, 94, 204. Furthermore, at least one of the accessories 40, 92, 160, 170, 202 is also provided. As noted above, the accessory 40, 92, 160, 170, 202 is mountable to the frame 19, 20 in place of the removable seat 26, 58, 93, 94, 204. Some of the accessories 40, 92, 202 include the second seat 58, 94, 204 and the platform 82, 140. As noted above, the platform 82, 140 provides the standing surface for a stroller occupant so the stroller occupant can selectively stand on the standing surface 82, 140 or sit on the second seat 58, 94, 204. The pivot handle 54, 56, 116, 206 is also provided, which, as detailed above, is pivotable to a position substantially surrounding an area above the platform 82, 140 to provide a gripping surface for the occupant when standing on the standing surface 82, 140. In addition, one or more of the other accessories 160, 170 (e.g., the basket 160, 170 or the car seat adapter 170) also may be provided to be mounted to the stroller 10, 90, 200 in place of at least one of the first or second seats 26, 58, 93, 94, 204 or in place of the other of the basket 160, 170 or the car seat adapter 170.

Though not shown in the illustrated examples, the example strollers described herein may also include other features including activity or food trays, music player holders, music players, adjustable canopies, adjustable headrests, adjustable seat backs, and/or harnesses that are adjustable and/or sewn into the seats and/or couplable to a crotch piece. In addition, the features described in the examples herein may be used in whole or in part in any of the other examples.

Although certain example methods and apparatus have been described herein, the scope of coverage of this patent is not limited thereto. On the contrary, this patent covers all methods, apparatus and articles of manufacture fairly falling within the scope of the disclosure either literally or under the doctrine of equivalents.

What is claimed is:

1. A stroller comprising:
   a frame;
   a seat coupled to the frame having a seat pan, wherein the seat pan is pivotable between a raised position and a lowered position, the seat pan to support a child in a seated position when the seat pan is in the lowered position;
   a storage compartment beneath the seat pan when the seat pan is in the lowered position, wherein when the seat pan is in the raised position, the storage compartment is accessible, and
   a seal comprising a groove in the seat pan to releaseably engage a top rim of the storage compartment when the seat pan is in the lowered position, the seal to releaseably lock the seat pan in the lowered position.

2. A stroller as defined in claim 1 further comprising a foot platform coupled to the frame adjacent the seat to support a child in a standing position, wherein the foot platform includes a collapsible leg.

3. A stroller as defined in claim 2, wherein at least a portion of the foot platform is vertically below a portion of the seat when the seat pan is in the lowered position, the seat further comprises a seat back and the seat pan is releaseably coupled to the seat back when the seat pan is in the raised position to enable a child to stand on at least a portion of the foot platform.

4. A stroller as defined in claim 3, wherein the seat back comprises a hand grip for use by a child in the standing position.

5. A stroller as defined in claim 2, wherein the foot platform is removable.

6. A stroller as defined in claim 2 further comprising a handle substantially surrounding an area above the foot platform to provide a gripping surface for the occupant when standing on the standing surface.

7. A stroller as defined in claim 6, wherein the handle is pivotable from a first position surrounding the area above the platform to a second position to facilitate entry to the platform.

8. A stroller as defined in claim 2, wherein the platform is pivotable between a deployed position and a stowed position.

9. A stroller as defined in claim 2, wherein the foot platform is coupled to the seat.

10. A stroller as defined in claim 1, wherein the seat is removably coupled to the stroller frame.

11. A stroller as defined in claim 1, wherein the stroller frame comprises a first seat mount and a second seat mount, and the seat comprises a first coupling receptacle couplable to the first seat mount and a second coupling receptacle couplable to the second seat mount, at least one of the first seat mount or the second seat mount includes a release latch to releaseably engage at least one of the first coupling receptacle or the second coupling receptacle.

12. A stroller as defined in claim 11, wherein the release latch is a spring-loaded button.

13. A stroller as defined in claim 11, further comprising one or more of a basket or a car seat adapter, the one or more basket or car seat adapter being removeably couplable to the first seat mount and the second seat mount.

14. A stroller as defined in claim 1 further comprising
   a pivotable handle that is pivotable relative to the seat and that has a raised position and a lowered position, in the raised position, the pivotable handle enables a child to enter or exit the stroller and in the lowered position, the pivotable handle substantially surrounds a child seated or standing in the stroller.

15. A stroller as defined in claim 14, wherein the pivotable handle includes a biasing member to bias the pivotable handle to the lowered position.

16. A stroller as defined in claim 15, wherein the biasing member is a torsion spring.

17. A stroller as defined in claim 14, wherein the pivotable handle is coupled to the seat.

18. A stroller as defined in claim 17, wherein the pivotable handle is coupled to the seat via a first extension and a second extension, wherein at least one of the first extension or the second extension includes a locking mechanism to releaseably lock the pivotable handle in the lowered position.

19. A stroller as defined in claim 18, wherein the locking mechanism includes a button that is selectively engageable with a latch to cause the latch to engage or disengage an interior wall of the joint extension.

20. A stroller as defined in claim 19, wherein the button acts against the force of a spring.

21. A stroller as defined in claim 1 further comprising an alternative seat to be mounted to the frame in place of the seat.

22. A stroller as defined in claim 1, wherein the seat is mounted to the frame via first and second bayonet coupling mechanisms.

23. A stroller as defined in claim 1, further comprising a basket to be mounted to the frame in place of the seat.

24. A stroller as defined in claim 23, wherein the basket is mounted to the frame via first and second bayonet coupling mechanisms.

25. A stroller as defined in claim 23, wherein the basket comprises a car seat adapter.

26. A stroller as defined in claim 1 further comprising a car seat adapter to be mounted to the frame in place of the seat.

27. A stroller as defined in claim 26, wherein the car seat adapter is mounted to the frame via first and second bayonet coupling mechanisms.

28. A stroller as defined in claim 1, wherein the stroller includes a parent handle bar for pushing the stroller, and a second seat that faces away from the parent handle bar.

29. A stroller as defined in claim 1, wherein the stroller includes a parent handle bar for pushing the stroller, and a second seat that faces toward the parent handle bar.

* * * * *